US012422918B2

(12) United States Patent
Wilson et al.

(10) Patent No.: US 12,422,918 B2
(45) Date of Patent: Sep. 23, 2025

(54) SYSTEMS AND METHODS FOR PROVIDING OBSERVATION SCENES CORRESPONDING TO EXTENDED REALITY (XR) CONTENT

(71) Applicant: Science Applications International Corporation, Reston, VA (US)

(72) Inventors: Andrew W. Wilson, Huntsville, AL (US); Ari J. Hollander, Seattle, WA (US)

(73) Assignee: Science Applications International Corporation, Reston, VA (US)

( * ) Notice: Subject to any disclaimer, the term of this patent is extended or adjusted under 35 U.S.C. 154(b) by 0 days.

(21) Appl. No.: 18/535,029

(22) Filed: Dec. 11, 2023

(65) Prior Publication Data
US 2024/0168545 A1     May 23, 2024

Related U.S. Application Data

(63) Continuation of application No. 17/663,037, filed on May 12, 2022, now Pat. No. 11,880,499.

(51) Int. Cl.
| | |
|---|---|
| *G06F 3/01* | (2006.01) |
| *G02B 27/01* | (2006.01) |
| *G06T 19/00* | (2011.01) |

(52) U.S. Cl.
CPC .......... *G06F 3/011* (2013.01); *G02B 27/0101* (2013.01); *G02B 27/017* (2013.01); *G02B 27/0179* (2013.01); *G06T 19/006* (2013.01); *G02B 2027/014* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 10,112,111 B2 * | 10/2018 | Marks | A63F 13/86 |
| 10,688,396 B2 | 6/2020 | Osman | |
| 11,058,950 B2 * | 7/2021 | Azmandian | A63F 13/86 |
| 11,163,358 B2 | 11/2021 | Marks et al. | |
| 2015/0049004 A1 | 2/2015 | Deering et al. | |
| 2017/0084073 A1 | 3/2017 | Pio et al. | |
| 2017/0277256 A1 * | 9/2017 | Burns | G06F 3/013 |

(Continued)

OTHER PUBLICATIONS

Oculus for Developers web page titled "Compositor Mirror," downloaded Dec. 21, 2021, from <https://developer.oculus.com/documentation/native/pc/dg-compositor-mirror/>, 7 pages.

(Continued)

*Primary Examiner* — Andre L Matthews
(74) *Attorney, Agent, or Firm* — Banner & Witcoff, Ltd.

(57) ABSTRACT

Systems, methods, apparatuses, and computer-readable media for creating an observation video are described. The observation video may comprise a viewport that moves in coordination with motion of an HMD user's head and that shows portions of VR content being output to the HMD user at different times. For each of those times, motion data from the HMD may be used to determine a position, orientation, and/or shape of the viewport. The observation video may also include an element that represents the HMD user, which element may comprise a video element video isolated from video of the user captured by a camera, and/or which may comprise an animated avatar.

21 Claims, 19 Drawing Sheets

(56) References Cited

U.S. PATENT DOCUMENTS

| | | | | |
|---|---|---|---|---|
| 2018/0374192 | A1* | 12/2018 | Kunkel | H04N 23/58 |
| 2019/0133689 | A1* | 5/2019 | Johnson | G09B 9/00 |
| 2019/0342632 | A1* | 11/2019 | DeFaria | G06T 15/20 |
| 2020/0391116 | A1 | 12/2020 | Osman | |
| 2021/0304705 | A1 | 9/2021 | Kolati et al. | |
| 2021/0319571 | A1 | 10/2021 | Oh | |
| 2021/0409677 | A1* | 12/2021 | Milk | H04N 13/111 |
| 2024/0105075 | A1* | 3/2024 | Kwon | G09B 9/00 |
| 2024/0207001 | A1* | 6/2024 | Yu | G06T 19/006 |

OTHER PUBLICATIONS

Augmented & Virtual Reality Glossary 2018, downloaded Feb. 10, 2022, from <https://www.iab.com/wp-content/uploads/2018/07/IAB_VR-AR_Glossary_v5b.pdf>, 29 pages.

"Your Window Into VR," downloaded Dec. 12, 2021, from <https://www.liv.tv>, 6 pages.

"Virtual Reality Spectator Screen / Unreal Engine Documentation," downloaded May 10, 2022, from <https://docs.unrealengine.com/4.27/en-US/SharingAndReleasing/XRDevelopment/VR/VRHowTos/VRSpectatorScreen/?msclkid=94f97674d07411ec83a83d85e6c6c21a>, 16 pages.

* cited by examiner

45(t6) {x(t6), y(t6), (t6), (t6), θ(t6), φ(t6), ψ(t6)}

SYSTEMS AND METHODS FOR PROVIDING OBSERVATION SCENES CORRESPONDING TO EXTENDED REALITY (XR) CONTENT

CROSS-REFERENCE TO RELATED APPLICATION

This application is a continuation of U.S. patent application Ser. No. 17/663,037, titled "Systems and Methods for Providing Observation Scenes Corresponding to Extended Reality (XR) Content" and filed May 12, 2022. U.S. patent application Ser. No. 17/663,037, in its entirety, is incorporated by reference herein.

BACKGROUND

Virtual reality (VR) is a broad term used to describe various techniques for providing a user with VR content that may include a visual representation of a simulated environment generated by a computer. Immersive forms of VR may output that visual representation to the user via special equipment such as a head-mounted display (HMD). That visual representation may fill a field of view (FOV) that is much larger than what can be presented on a flat panel display and may change in coordination with movement of the user's head, thereby giving the HMD-wearing user the sensation of being inside the simulated environment. VR is a valuable tool for entertainment, training, and other uses.

It may be desirable to allow persons other than an HMD-wearing user to observe what the HMD-wearing user is seeing. For example, an HMD wearer may be a student using VR simulation to train as an aircraft pilot, and an instructor may wish to observe what the student is seeing so as to evaluate the student's progress. As but another example, an HMD wearer may be playing an immersive video game, and other persons may wish to observe what that player is seeing during game play (e.g., to decide whether to purchase the game).

Sharing VR content with observers presents numerous challenges. Existing VR systems can be configured to share data that is provided to the HMD to generate a visual representation that is output to a user via HMD. Observers can be provided with separate HMDs to wear, and the shared data can be input to those separate HMDs to create the same visual representation that is seen by a wearer of an HMD that is controlling the VR output (e.g., the HMD for which movements control what visual representation is generated). However, such an approach is expensive, as there is cost associated with multiple HMDs, and is often impractical. Moreover, using an HMD to view content that is being generated by an HMD worn by another user can be disorienting, may induce nausea and/or headaches, and/or may otherwise be disconcerting.

As an alternative, data from an HMD worn by a VR participant can be used to generate video that may be output via a conventional flat panel display (e.g., a computer monitor, a laptop screen, etc.) Although this avoids the expense associated with providing observers with separate HMDs, it does little to avoid other issues associated with viewing video from an HMD that is worn by another person who is controlling the VR experience. Because the video would be coordinated to the movements of the HMD wearer, it would appear to observers watching the second display as an unstable (e.g., randomly shaking, shifting, and/or rotating) video. Watching such a video can be very unpleasant and may induce nausea and/or headaches. It may also fail to convey a sense of the immersion being experienced by the HMD wearer.

In some cases, it may be possible to generate VR content for a more stable view of the VR experience of the HMD wearer. For example, it may be possible to generate a secondary view, within the VR environment, that corresponds to a virtual observer standing behind or to the side of a virtual avatar corresponding to the HMD wearer. Such a secondary view may be more stable and not locked to movements of the HMD. However, this solution requires modification of (and thus access to) the software used to create the VR experience, and is often impractical.

SUMMARY

This Summary is provided to introduce a selection of some concepts in a simplified form as a prelude to the Detailed Description. This Summary is not intended to identify key or essential features.

Extended reality (XR) content may be output to a user, via a head-mounted display (HMD) and/or other XR display, based on position and/or orientation of the display. That XR content, together motion data for the XR display, may be output to an additional computer and used to create a separate observation video. That observation video may be viewed by one or more observers. The observation video may comprise portions of the XR content segments, as well as clues that indicate to observers how those portions relate to motion of the XR display user's head in an XR environment. The observation video may present those portions and clues in a way less like likely to induce nausea, headaches, and/or other unpleasant effects that may be associated with viewing raw output from an XR feed via a second display. Moreover, the observation video may be generated using already available data output and without requiring modification of XR software to create a separate view.

Systems, methods, apparatuses, and computer-readable media for creating observation scenes are described. Observation scenes, which may be combined into an observation video, may comprise viewports that shows portions of the XR content seen by an XR display user at different times. For each of those times, motion data for the XR display may be used to determine a position, orientation, and/or shape of the viewport, and a portion of the XR content being output to the XR display user may be added to the viewport. In a resulting observation video, a viewport may appear to move across the display in coordination with movement of the XR display user (e.g., a head of that user wearing an HMD), and may provide a view into the XR environment being experienced by the user. The observation video may also include an element that represents the user, which element may comprise a video element isolated from video of the user captured by a camera, and/or which may comprise an animated avatar.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

As explained above, virtual reality (VR) is a broad term used to describe various methods for providing a user with VR content that may include a visual representation of a simulated environment generated by a computer. VR is a subset of methods, often known as extended reality or x-reality (XR), for creating virtual or mixed virtual/real environments which human users may observe and/or with which human users may interact. In addition to VR, XR may include augmented reality (AR) and mixed reality (MR). Methods and systems described herein may be used with various types of XR and are not limited to use in connection with VR.

Figure 1:
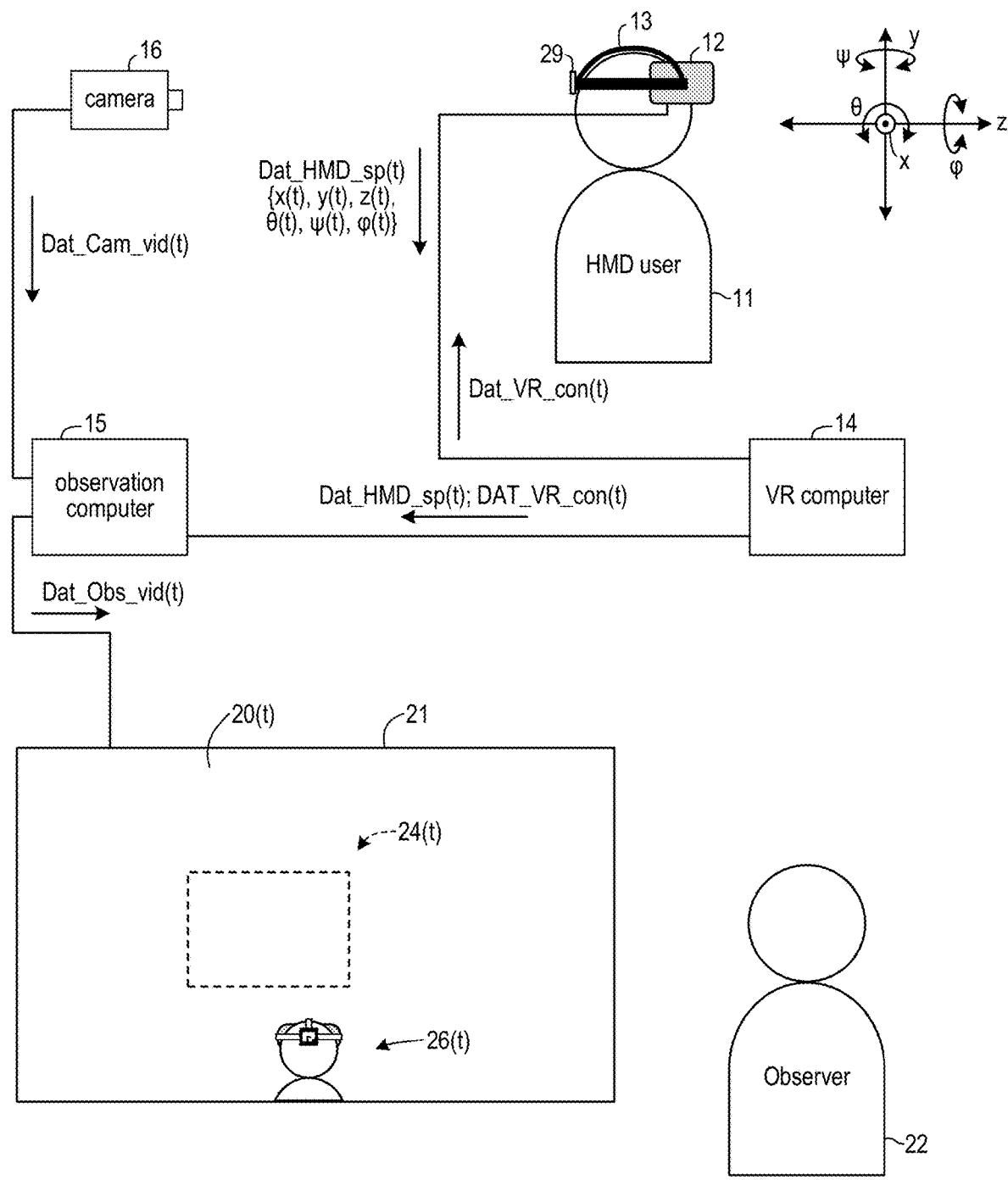
FIG. 1 is a partially schematic block diagram showing elements of an example system for providing one or more observers with an observation video associated with extended reality (XR) content being output via an XR display.

FIG. 1 is a partially schematic block diagram showing elements of an example system for providing one or more observers with a viewport video associated with XR content being output to an XR user via an XR display. In the example of FIG. 1, the XR content is VR content, the XR display is a head-mounted display (HMD), and the XR user is a wearer/user of the HMD. In particular, an HMD user 11 is wearing an HMD 12 and is shown in profile from the right side of the user 11. The HMD 12 may be a commercially available HMD and may be secured to the head of the HMD user 11 (e.g., by a harness/strap system 13) so as to place one or more internal display screens of the HMD 12 in front of the eyes of the HMD user 11. The HMD 12 may comprise a single internal display screen (e.g., visible by both eyes of the HMD wearer 11) or may comprise multiple internal display screens (e.g., separate screens for each of the eyes of the HMD user 11 so as provide stereoscopic/three-dimensional video). The HMD 12 may further comprise one or more internal motion sensors that track motion of the HMD 12 and of the head of the HMD user 11 to which the HMD 12 is secured. The internal motion sensors may track motion in six degrees of freedom that comprise three axes of translation and three axes of rotation. Also or alternatively, the HMD 12 and/or the internal motion sensors of the HMD 12 may receive reference information from one or more external devices. For example, a "lighthouse" device may generate a precision infrared laser reference grid and/or a camera may track colored lights or printed patterns on the HMD.

Any coordinate system and/or convention may be used to track motion of the HMD 12. For convenience, however, the examples herein will assume that the internal sensors of the HMD 12 track motion based on the three axes of translation and the three axes of rotation shown in FIG. 1. For example, the HMD 12 may move up or down (e.g., as the head of the HMD user 11 translates up or down) along a y axis that corresponds to up and down vertical directions, forward or backward (e.g., as the head of the HMD user 11 translates forward or backward) along a z axis that corresponds to first horizontal directions, and/or left or right (e.g., as the head of the HMD user 11 translates left or right) along an x axis that is perpendicular to the y and z axes and that corresponds to second horizontal directions. The HMD 12 may rotate about a pitch axis 6 (e.g., as the head of the HMD user 11 tilts up or down) that coincides with the x axis, about a yaw axis L (e.g., as the head of the HMD user 11 turns to the left or right) that coincides with the y axis, and/or about a roll axis p (e.g., as the head of the HMD user 11 tilts to the left or right) that coincides with the z axis.

As the HMD 12 moves in translation and/or rotation, and/or at periodic or other intervals, the HMD 12 may output HMD spatial data for the HMD 12. HMD spatial data for a time t may be represented as Dat_HMD_sp(t) and may comprise position data for the HMD 12 at that time t (e.g., location of the HMD 12 in x, y, and z linear coordinates of the x, y, and z axes, represented as x(t), y(t), z(t)) and/or orientation data for the HMD 12 at that time t (e.g., rotational orientation of the HMD 12 in θ, ψ, and φ rotational coordinates of the θ, ψ, and φ axes, represented as θ(t), ψ(t), φ(t)). The HMD 12 may output the HMD spatial data Dat_HMD_sp(t) to a VR computer 14. The VR computer 14 may, based on that spatial data, generate VR content data Dat_VR_con(t) for a VR content segment (e.g., one or more frames of VR video) corresponding to the time t. The VR content data Dat_VR_con(t) may be renderable, via the HMD 12, to output the VR content segment, which may comprise a visual representation of a VR environment that is being viewed by the HMD user 11 via the HMD 12, and may correspond to the position and/or orientation of the head of the HMD user 11 (or to an avatar of the HMD user 11) in that VR environment that the HMD user 11 is experiencing. The VR content data Dat_VR_con(t) may comprise data for multiple video frames, per pixel depth buffer data (e.g., for 3D rendering), per pixel motion vector data, audio data (e.g., 3D audio data), and/or other types of data. The VR computer 14, which may be executing software that generates that VR environment and which may be controlled (at least in part) by HMD spatial data received from the HMD 12, outputs the VR content data Dat_VR_con(t) to the HMD 12. Using that data Dat_VR_con(t), the HMD 12 may render the VR content segment corresponding to the time t via the internal display(s) of the HMD 12. Although FIG. 1 shows HMD spatial data Dat_HMD_sp(t) and VR content segment data Dat_VR_con(t) corresponding to the same time t, there may be a small time difference between a time that HMD spatial data Dat_HMD_sp(t) is generated by the HMD 12 and a time that the HMD 12 outputs a VR content segment based on the corresponding VR content segment data Dat_VR_con(t). However, this time difference may be very small (e.g., milliseconds or microseconds) and may be imperceptible (or barely perceptible) to the HMD user 11. Accordingly, such latency (and latencies associated with other communications or video outputs) will be ignored in the descriptions herein.

The VR computer 14 may also output the HMD spatial data Dat_HMD_sp(t) and the VR content segment data Dat_VR_con(t) to an observation computer 15. For example, many types of VR software/systems include an application programming interface (API) that may allow other software/systems to access content data (e.g., video data) for content (e.g., video) being output to an HMD, and may, in addition, provide access to motion data for such an HMD. The observation computer 15 may also receive data Dat_Cam_vid(t) for video, generated by a camera 16, of the HMD user 11 at time t. As an alternative to receiving the HMD spatial data Dat_HMD_sp(t) from the VR computer 14, or in addition to receiving the HMD spatial data Dat_HMD_sp(t) from the VR computer 14, the observation computer 15 may determine HMD spatial data corresponding to the time t based on the data Dat_Cam_vid(t) received from the camera 16. For example, a target 29 may be secured to the HMD 12 or the harness 13, and/or otherwise coupled to the head of HMD user 11 so as to have a fixed and known spatial relationship to the HMD 12. The target 29 may be comprise an asymmetric pattern (e.g., an AruCo marker) that may be used to determine, using one or more known image recognition algorithms, a position and/or orientation of the target 29 within a video frame captured by the camera 16. Based on the position and orientation of the target 29 determined from a video frame, and based on the known spatial relationship of the target 29 relative to the HMD 12, HMD spatial data for the HMD may be derived.

The observation computer 15 may, by performing operations such as are described herein, generate data Dat_Obs_vid(t) for an observation scene (e.g., a frame) of an observation video and may send the observation scene data Dat_Obs_vid(t) to a display device 21 (e.g., a flat panel display, a computer screen, etc.). The display device 21 may use the data Dat_Obs_vid(t) to render and display an observation scene 20(t) as part an observation video (comprising the scene 20(t) and other similarly generated scenes) that may be watched by one or more observers 22.

The observation scene 20(t) may comprise a viewport element 24(t). The content of the viewport element 24(t) may provide observers 122 of the observation video comprising the observation scene 20(t) with a window into the VR environment being experienced by the HMD user 11. Moreover, the viewport element 24 may have a position, orientation, shape, and/or size that provides observers with visual clues as to the position and/or orientation of the HMD user 11 in that VR environment. For example, the content of the viewport 24(t) may comprise a portion of the VR content segment being output via the HMD 12 at time t. The location and/or orientation of the viewport 24(t) may be based on HMD spatial data, received from the VR computer 14 and/or determined by the observation computer 15, that corresponds to the position and/or orientation of the HMD 12 at time t. As the position and/or orientation of the HMD 12 change, and as VR content segments output via the HMD 12 change based on changes to the HMD 12 position and/or orientation, the content, location, orientation, shape, and/or size of the viewport elements of other observation scenes of the observation video may also change. By displaying a series of observation scenes comprising viewport elements based on HMD 12 content segment output and HMD 12 position/orientation at different times, the observation video shows a viewport that provides a window into the VR environment being experienced by the HMD user 11, which window moves in coordination with movements of the HMD 12.

The observation scene 20(t) may comprise additional elements. For example, observation scene 20(t) may comprise an HMD user element 26(t) that shows the HMD user 11. The element 26(t) may be generated, as part of the observation scene 20(t), based on the data Dat_Cam_vid(t) received from the camera 16. As the HMD user 11 moves, position and/or orientation of HMD wearer elements (or of portions of such elements) may change in corresponding observation scenes. The elements 24(t) and 26(t) may be shown against a background. That background may be blank or may comprise imagery that may be added using green screening or other background addition methods. Some or all of that background may be static (e.g., remaining the same in multiple observation scenes) or dynamic (e.g., changing in multiple observation scenes).

For convenience, FIG. 1 shows lines interconnecting the camera 16, the observation computer 15, the VR computer 14, the HMD 12, and/or the display device 21 to indicate communication flow paths. Communications between devices need not be via wired media, however. Any or all of the devices shown in FIG. 1 may communicate wirelessly and/or by wired connection. Moreover, functionality of devices shown in FIG. 1 may be combined into fewer devices and/or differently distributed among devices. For example, the VR computer 14 and the HMD 12 may be combined into a single physical device (e.g., the HMD 12 could comprise a computer performing operations described for the VR computer 14), the operations described for the VR computer 14 and the observer computer 15 could be performed by a single computer, the display device 21 may be display screen that is integral to the observation computer 15, and/or other combinations and/or distributions of devices and/or function may be made.

Figure 2:
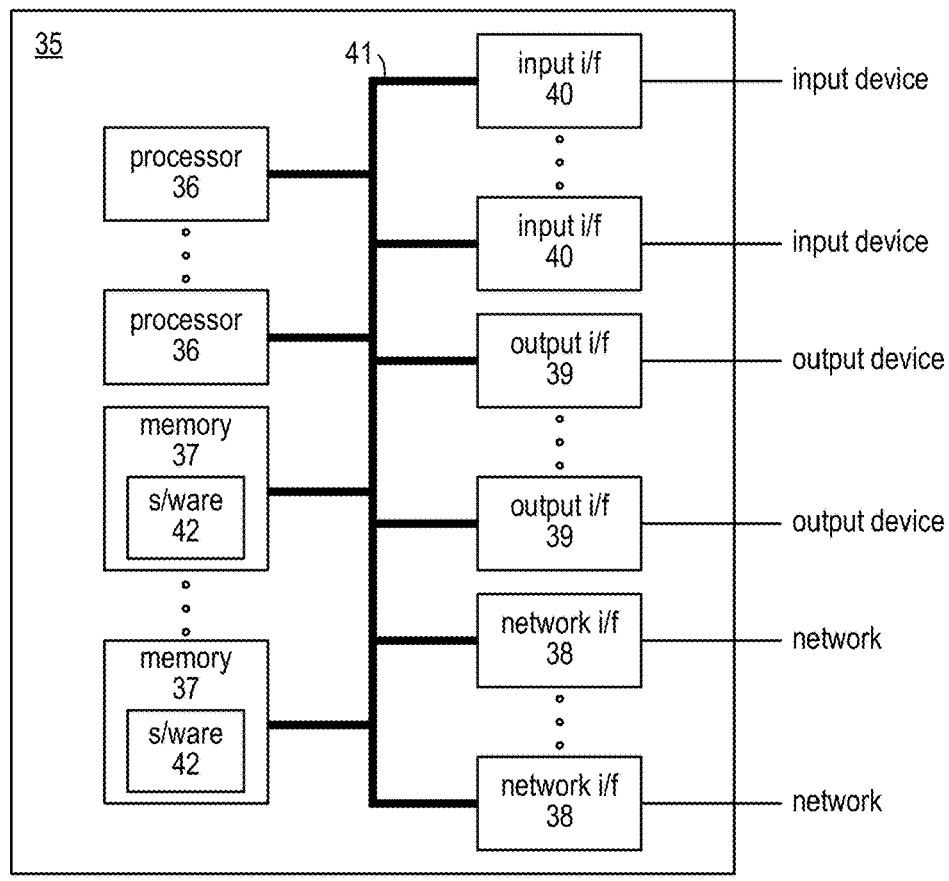
FIG. 2 is a block diagram of an example computer.

FIG. 2 is a block diagram of an example computer 35, one or more of which may be used to implement the VR computer 14, the observation computer 15, computational components of the HMD 12, computational components of the camera 16, computational components of the display 21, and/or other computer(s) and/or devices configured to perform operations such as those described herein. The computer 35 may comprise one or more processors 36, one or more memories 37, one or more input interface controllers 40, one or more output interface controllers 39, and one or more network interfaces 38, all of which may communicate over one or more busses 41. Processor(s) 36 may include any of various types of computational devices such as, without limitation, programmable microprocessors. Processor(s) 36 may execute instructions that cause computer 35 to perform one or more operations such as are described herein.

Memory(ies) 37 may include any of various types of non-transitory machine-readable storage media such as, without limitation, random access memory (RAM), read-only memory (ROM), FLASH memory, magnetic tape or discs, optical discs, etc. Memory(ies) 37 may be volatile or non-volatile. Input interface controller(s) 40 may include hardware and/or software that allow user input devices (e.g., a keyboard, a mouse, a touch screen, camera imaging elements, motion sensors) to communicate data to processor(s) 36. Output interface controller(s) 39 may include hardware and/or software that allow user output devices (e.g., display screens, printers) to output user-understandable information based on data from processor(s) 36. Network interface(s) 38 may include hardware and/or software that allow processor(s) 36 to communicate with processors of other computers via one or more types of wired or wireless networks. Examples of network interfaces include, without limitation, Ethernet adaptors and Wi-Fi adaptors (e.g., operating in accordance with one or more IEEE 802.11 WLAN standards).

Memory(ies) 37 may store software 42 that provides instructions to processor(s) 36 that, when executed by processor(s) 36, cause computer 35 to perform some or all operations such as are described herein. Software 42 may comprise machine-executable instructions and/or other data, and may include both application software and operating system software. Executable instructions that cause computer 35 to perform operations such as are described herein may also or alternatively be stored in other forms, e.g., as firmware or as hardware logic in an integrated circuit.

Figure 3:
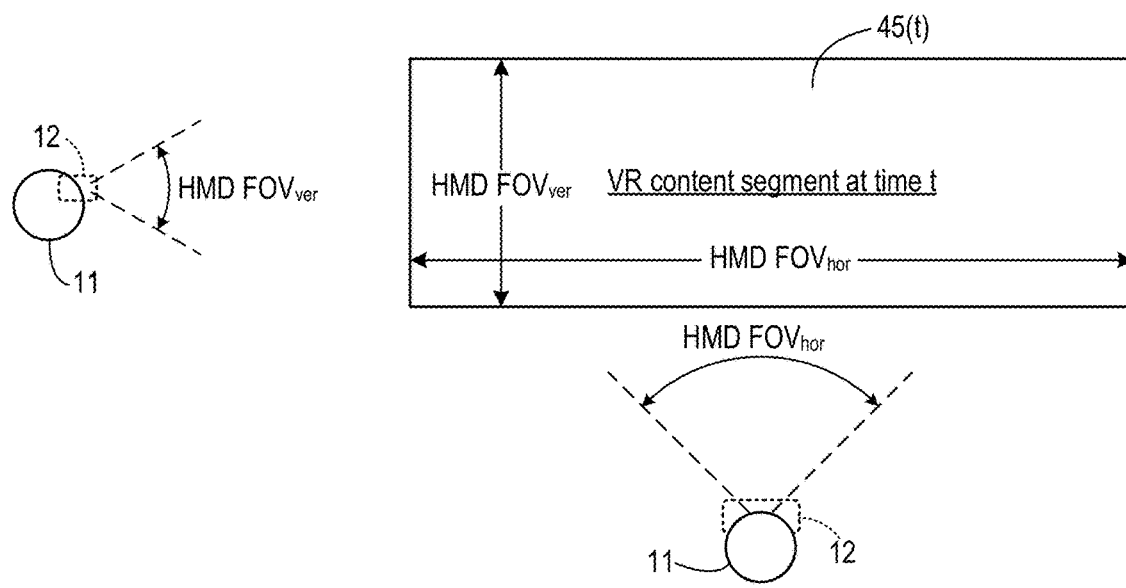
FIG. 3 is a diagram showing horizontal and vertical FOVs of a VR content segment output by the HMD of FIG. 1.

FIG. 3 is a diagram showing horizontal field of view (FOV) and vertical FOV of a content segment output by the HMD 12. FIG. 3 shows a VR content segment 45($t$), which may comprise a visual representation, being output by the HMD 12 to the HMD user 11 at a time t based on the VR content segment data Dat_VR_con(t), of a portion of a VR environment. Although VR content segment 45($t$) and other VR content segments are shown as rectangles, this is only for convenience. HMD optics may be configured so that an apparent optical distance to the HMD display(s) from the user's eyes is much higher than actual physical distance, and the apparent shape of the HMD display(s) may be altered by lenses, optical filters, etc. An apparent physical surface of an HMD's display(s) may comprise a 3D curved rectangle that may be similar to a rectangular cutout of a sphere. There may also be late-stage image processing in VR computers that warps a final rendered image to match an optical geometry of the HMD, resulting in an approximately circular set of physically displayed pixels (with the corner pixels blacked out).

As indicated by the top view of the HMD user 11 and the HMD 12 located under the VR content segment 45($t$), a horizontal FOV for the HMD 12 (HMD $FOV_{hor}$) corresponds to how wide the VR content segment 45($t$) may appear to the HMD user 11. As indicated by the right side view of the head of the HMD user 11 and the HMD 12 located to the left of the VR content segment 45($t$), a vertical FOV for the HMD 12 (HMD $FOV_{ver}$) corresponds to how tall the VR content segment 45($t$) may appear to the HMD user 11. The proportions of HMD $FOV_{hor}$ and HMD $FOV_{ver}$ shown in FIG. 2 are merely examples selected for convenience in the drawings and not necessarily intended to indicate actual proportions of horizontal and vertical FOV. Actual values for a horizontal FOV of an HMD vary, but may be 90° or more. Actual values for a vertical FOV of an HMD also vary, but may also be 90° or more.

Figure 4:
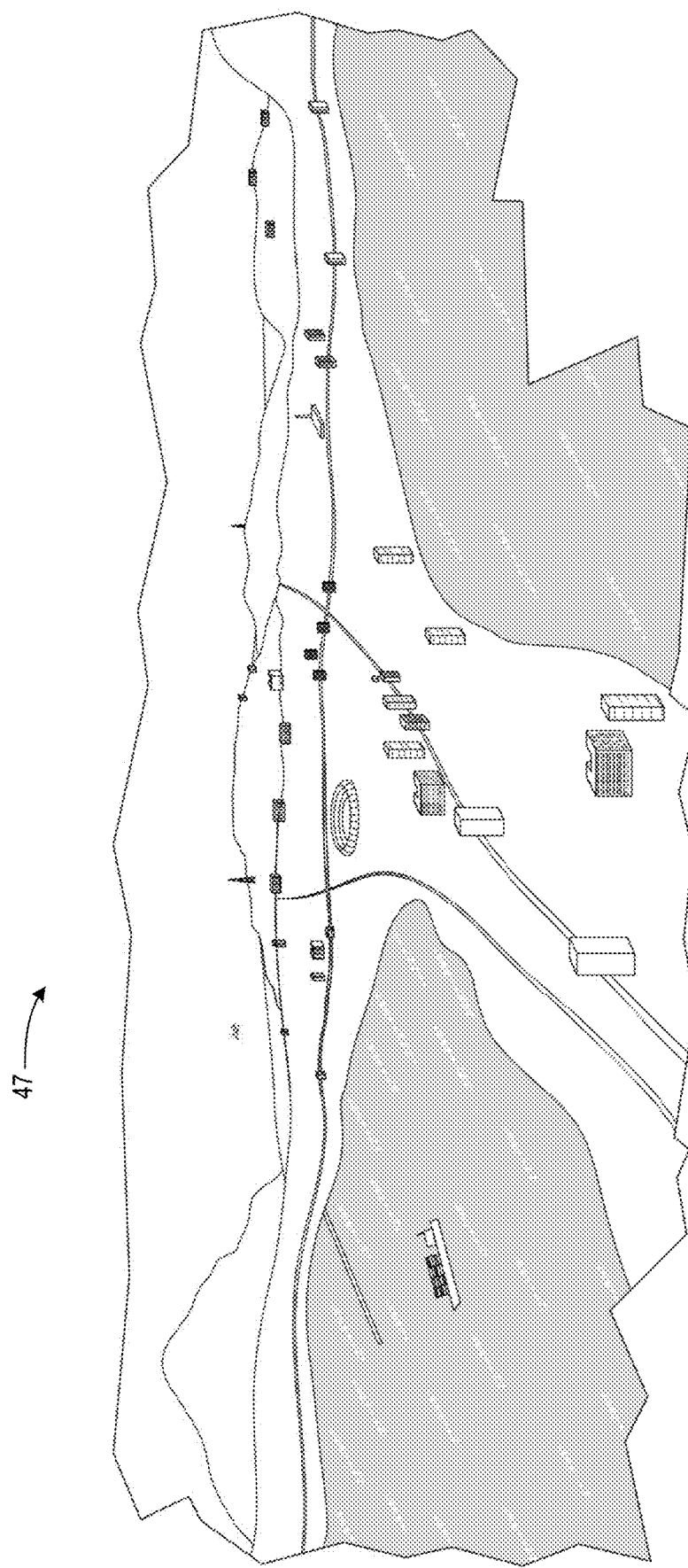
FIG. 4 shows an approximation of a VR environment that may be displayed, via the HMD of FIG. 1, as a plurality of VR content segments corresponding to different portions of the VR environment.

FIG. 4 shows part a VR environment 47. Different portions of the VR environment 47 may be output, via the display(s) of the HMD 12 to the HMD user 11, as a plurality of VR content segments. The VR environment 47, which represents a large geographic region over which a participant in the VR environment 47 (e.g., the HMD user 11) may be virtually flying (e.g., as part of a flight simulator program) is only one example of a VR environment with which methods, devices, and systems described herein may be used. It is understood that, because of limitations associated with drawn images on a patent document drawing sheet, FIG. 4 is only a rough approximation a VR environment that may extend in three dimensions significantly beyond what is shown in FIG. 4. Moreover, the VR computer 14 may not render all of what is shown in FIG. 4 at once. For example, at any given time t the VR computer 14 may only render portions of the VR environment 47 corresponding to a content segment that is being output, via the HMD 12, based on a position and/or orientation of the HMD 12. Portions of the VR environment 47 outside the horizontal FOV (HMD $FOV_{hor}$) and the vertical FOV (HMD $FOV_{ver}$) of the HMD 12 may not be rendered until those portions come into view (e.g., as the head of the HMD user 12 moves).

Figure 5A:
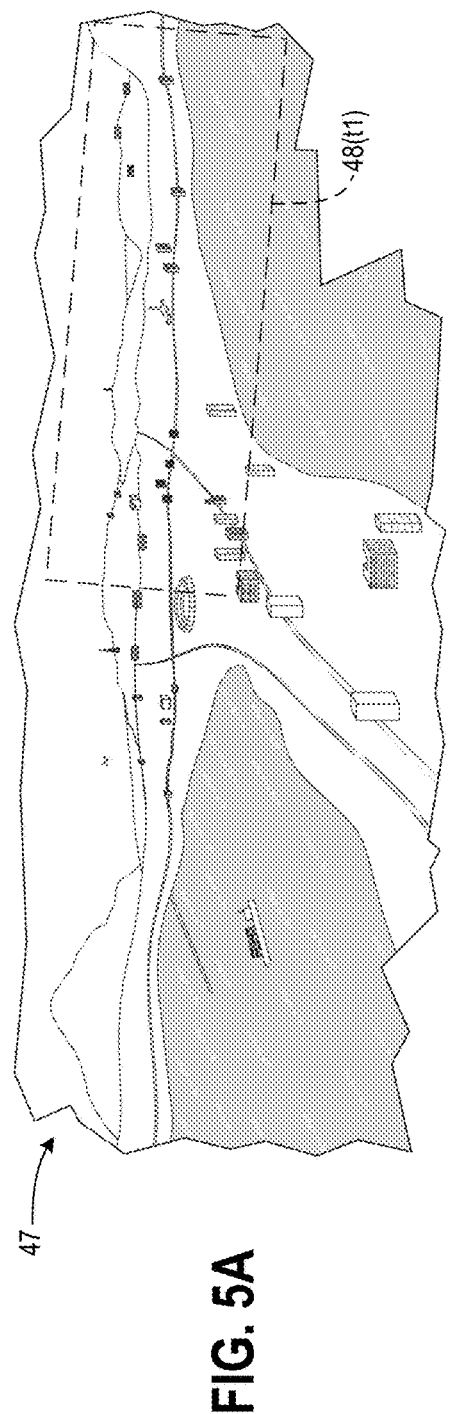
FIG. 5A shows a portion of the VR environment of FIG. 4 corresponding to a position and orientation of the HMD of FIG. 1 and to a time t1.
Figure 5B:
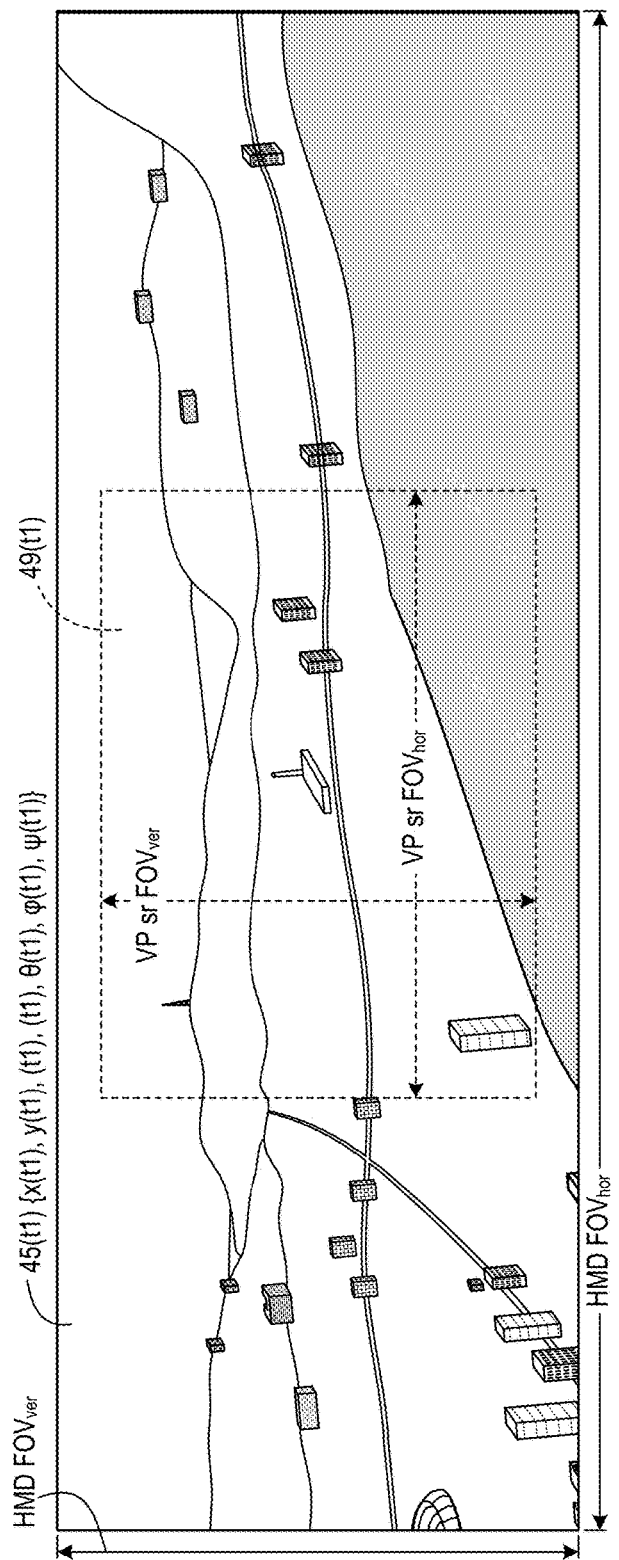
FIG. 5B shows a VR content segment output via the HMD of FIG. 1 and corresponding to the time t1.

FIG. 5A shows a portion 48($t1$) of the VR environment 47 corresponding to a position and orientation of the HMD 12 at a time t1. At time t1, for example, the head of the HMD user 11 may be yawed right, pitched up, and rolled clockwise. FIG. 5B shows a VR content segment 45($t1$) that may be output via the HMD 12 and that corresponds to the portion 48($t1$), to the time t1, and to the position and the orientation {x(t1), y(t1), z(t1), θ(t1), φ(t1), ψ(t1)} of the HMD 12 at time t1. Also shown in FIG. 5B is a sub-region 49($t1$) of the VR content segment 45($t1$). The sub-region 49($t1$) and other sub-regions described herein may have a fixed position and size that is constant. For example, the sub-region 49($t1$) may be a sub-region of the VR content segment 45($t1$) that is vertically and horizontally centered in the VR content segment 45($t1$), that has a width less than a width of the VR content segment 45($t1$), and that has a height less than a height of the VR content segment 45($t1$). The width of the sub-region 49($t$) may correspond to a horizontal FOV (VP sr $FOV_{hor}$) that is less than the HMD horizontal FOV (HMD $FOV_{hor}$). The height of the sub-region 49($t$) may correspond to a vertical FOV (VP sr $FOV_{ver}$) that is less than the HMD vertical FOV (HMD $FOV_{ver}$). Alternatively, sub-regions associated with different VR content segments may have different locations in different VR content segments (e.g., locations based on eye-tracking of an HMD wearer). Also or alternatively, sub-regions associated with different VR content segments may have different sizes and/or shapes in different VR content segments.

Figure 5C:
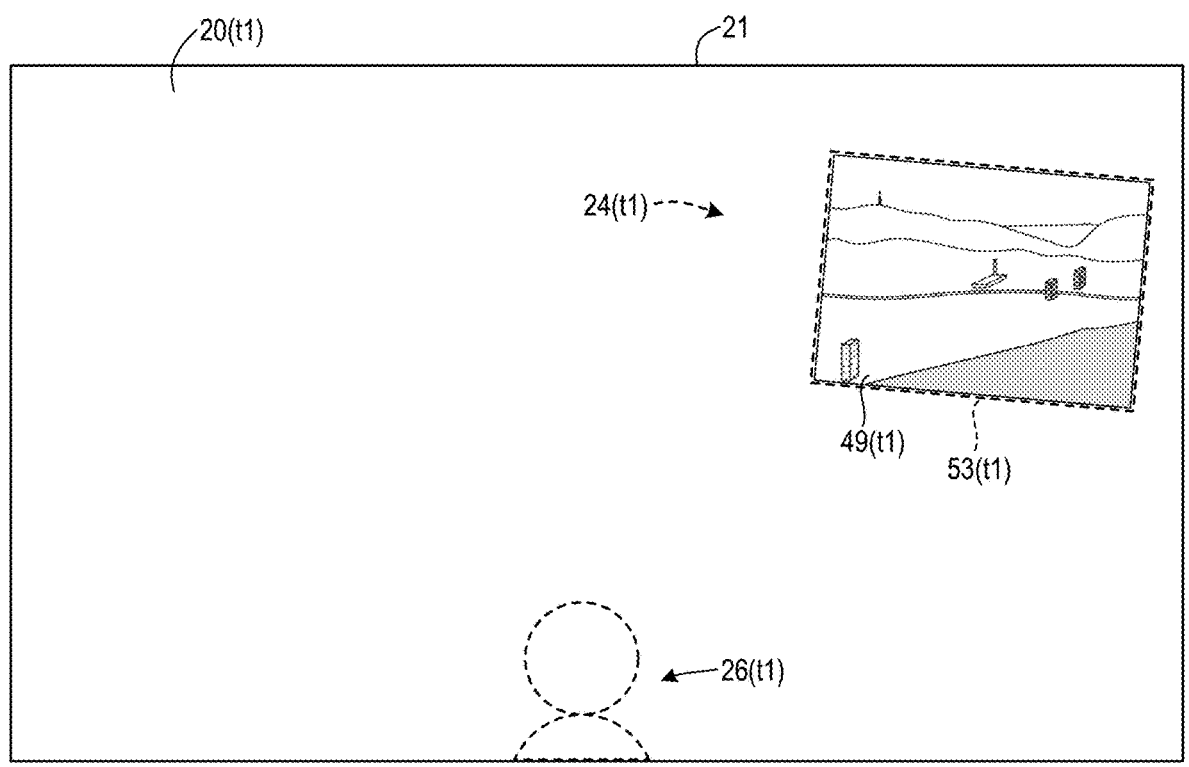
FIG. 5C shows an observation scene, of an observation video, corresponding to the VR content segment of FIG. 5B and to the time t1.

FIG. 5C shows an observation scene 20($t1$), corresponding to the VR content segment 45($t1$) and to the time t1, that may be output via the display 21. The observation scene 20($t1$), which may be part of an observation video comprising multiple observation scenes that are displayed sequentially, may comprise a planar view of a three-dimensional space associated with the HMD 12. For example, the observation scene 20($t1$) (and other observation scenes of the observation video) may comprise a view, from behind the HMD user 11, of a space in which the HMD user 11 is located That space may be an actual space (e.g., a video of a room which the HMD user 11 is located) or a computer-generated space (e.g., the HMD user 11 may appear in front of a computer-generated background). The observation scene 20($t1$) comprises a viewport element 24($t1$). The viewport element 24(*t*1) may comprise a viewport sub-region 53(*t*1) into which the VR content segment sub-region 49(*t*1) has been added. The location and the orientation of the viewport element 24(*t*1) may be based on the position and orientation data, for the HMD 12, corresponding to the VR content segment 45(*t*1). In the example of FIG. 5C, because the head of the HMD user 11 is at time t1 yawed right, pitched up, and rolled clockwise, the position of the viewport element 24(*t*1) is shifted up and to the right in the planar view and has a clockwise rotation.

Viewport elements in the examples of FIGS. 5A-12 are all the same size and shape, with only location and rotation (in the plane of an observation scene) being affected by HMD movement. This is for convenience and to simplify description of certain aspects of the disclosure. However, size and shape of viewport elements may also be affected by HMD movement. For example, as the head of the HMD user 11 moves back and forth relative to the planar slice of observation view (e.g., along the z axis of FIG. 1), the scale/size of viewport elements may increase (as the HMD user 11 moves closer) or decrease (as the HMD user 11 move farther away). Also or alternatively, and as described in more detail below, the shape of viewport elements may distort into a trapezoid as the HMD user 11 looks left, right, up, or down. Sizes of viewport elements may changes as the HMD user 11 looks left, right, up, or down Also shown in FIG. 5C is an HMD user element 26(*t*1). The element 26(*t*1) may be an image of the HMD user 11, at the time t1, obtained from data received from the camera 16. Although not shown in FIG. 5C, the element 26(*t*1) may show the HMD user 11 looking toward the viewport element 24(*t*1), thereby giving additional clues as to the relationship between the portion of a VR environment that is shown by the viewport element 24(*t*1) and how the HMD user 11 is interacting with (e.g., moving within) that VR environment.

Figure 6A:
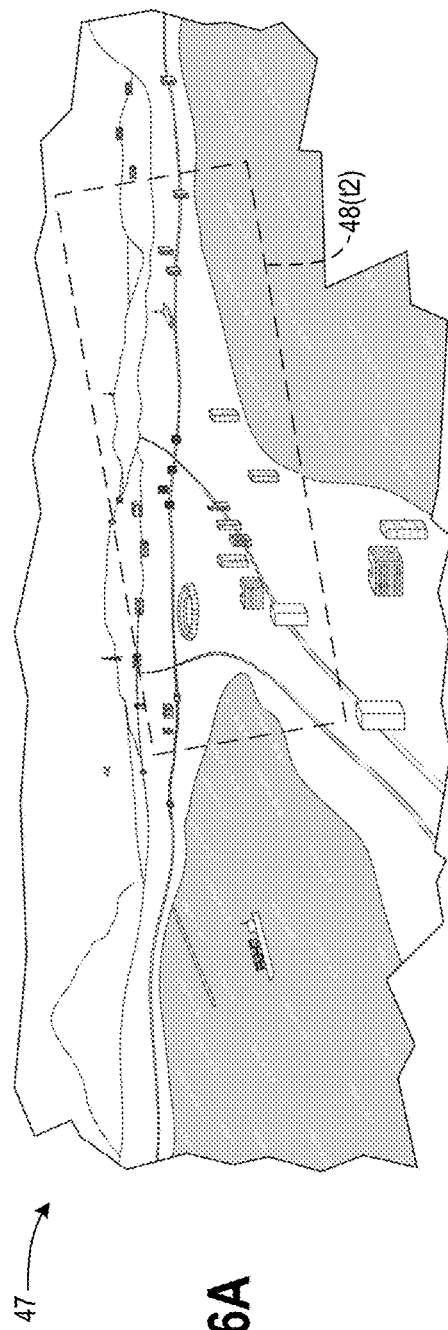
FIGS. 6A, 6B, and 6C are respectively similar to FIGS. 5A, 5B, and 5C, but correspond to a time t2.
Figure 6B:
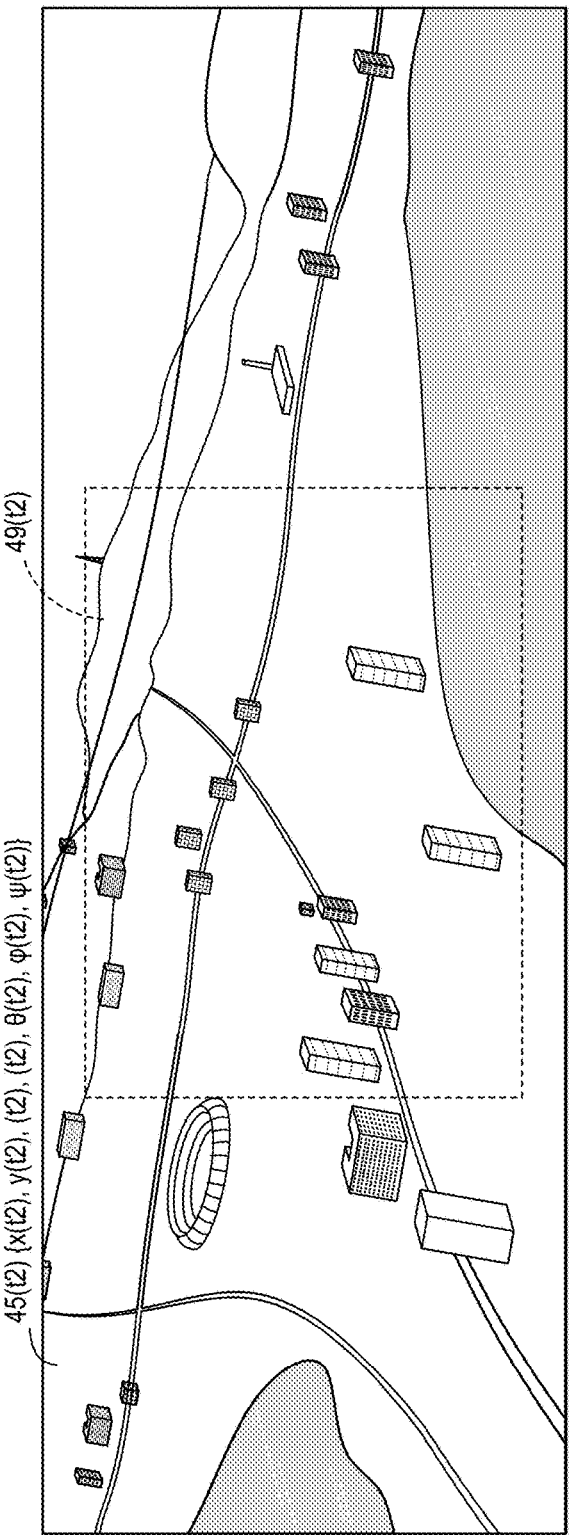
Figure 6C:
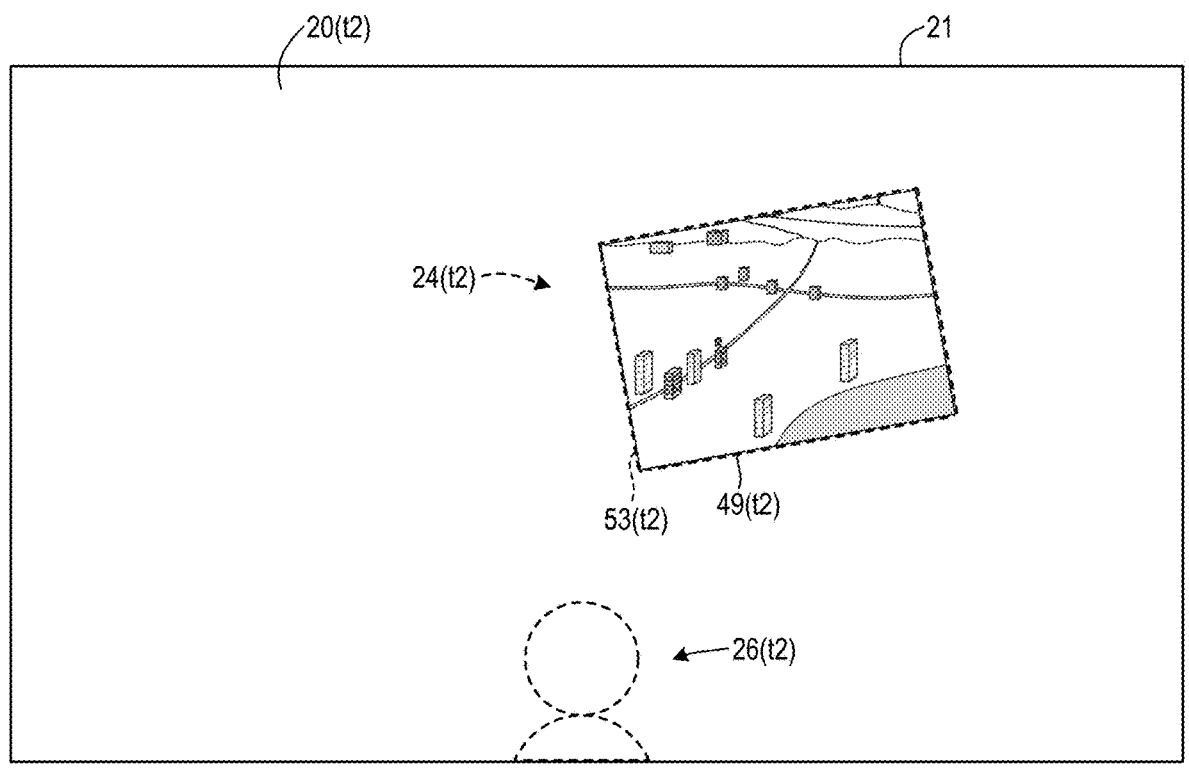

FIG. 6A shows a portion 48(*t*1) of the VR environment 47 corresponding to a position and orientation of the HMD 12 at a time t2. Time t2 may be after time t1. At time t2, the head of the HMD user 11 may be yawed right (though not as far right as at time t1), pitched up (though not as far up at time t1), and rolled counterclockwise. FIG. 6B shows a VR content segment 45(*t*2) that may be output via the HMD 12 and that corresponds to the portion 48(*t*2), to the time t2, and to the position and the orientation {x(t2), y(t2), z(t2), θ(t2), φ(t2), ψ(t2)} of the HMD 12 at time t2. Also shown in FIG. 6B is a sub-region 49(*t*2) of the VR content segment 45(*t*2). FIG. 6C shows an observation scene 20(*t*2), corresponding to the VR content segment 45(*t*2) and to the time t2, that may be output via the display 21, and that may be part of the observation video that comprises the observation scene 20(*t*1). A viewport element 24(*t*2) may comprise a viewport sub-region 53(*t*2) into which the VR content segment sub-region 49(*t*2) has been added. The location and the orientation of the viewport element 24(*t*2) may be based on the position and orientation data, for the HMD 12, corresponding to the VR content segment 45(*t*2). In the example of FIG. 6C, because the head of the HMD user 11 is at time t2 yawed right, pitched up, and rolled counterclockwise, the position of the viewport element 24(*t*2) has a counterclockwise rotation and is shifted up and to the right in the planar view of the three-dimensional space associated with the HMD 12. The element 26(*t*2) may be an image of the HMD user 11, at the time t2, obtained from data received from the camera 16. Although not shown in FIG. 6C, the element 26(*t*2) may show the HMD user 11 looking toward the viewport element 24(*t*2), thereby giving additional clues as to the relationship between the portion of a VR environment that is shown by the viewport element 24(*t*2) and how the HMD user 11 is interacting with (e.g., moving within) that VR environment.

Figure 7A:
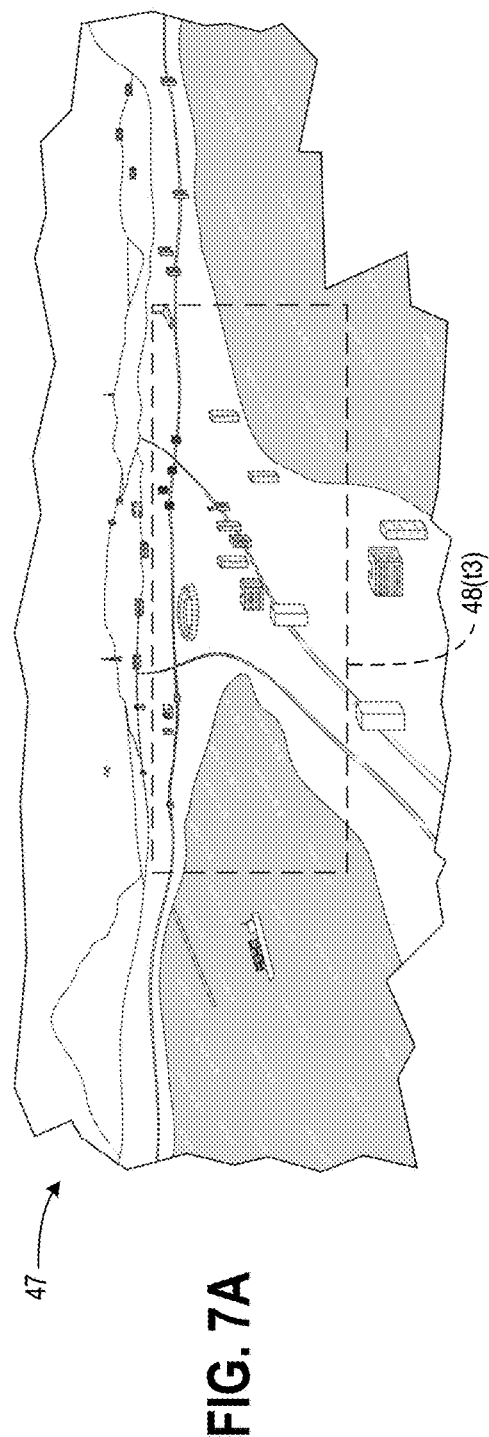
FIGS. 7A, 7B, and 7C are respectively similar to FIGS. 5A, 5B, and 5C, but correspond to a time t3.
Figure 7B:
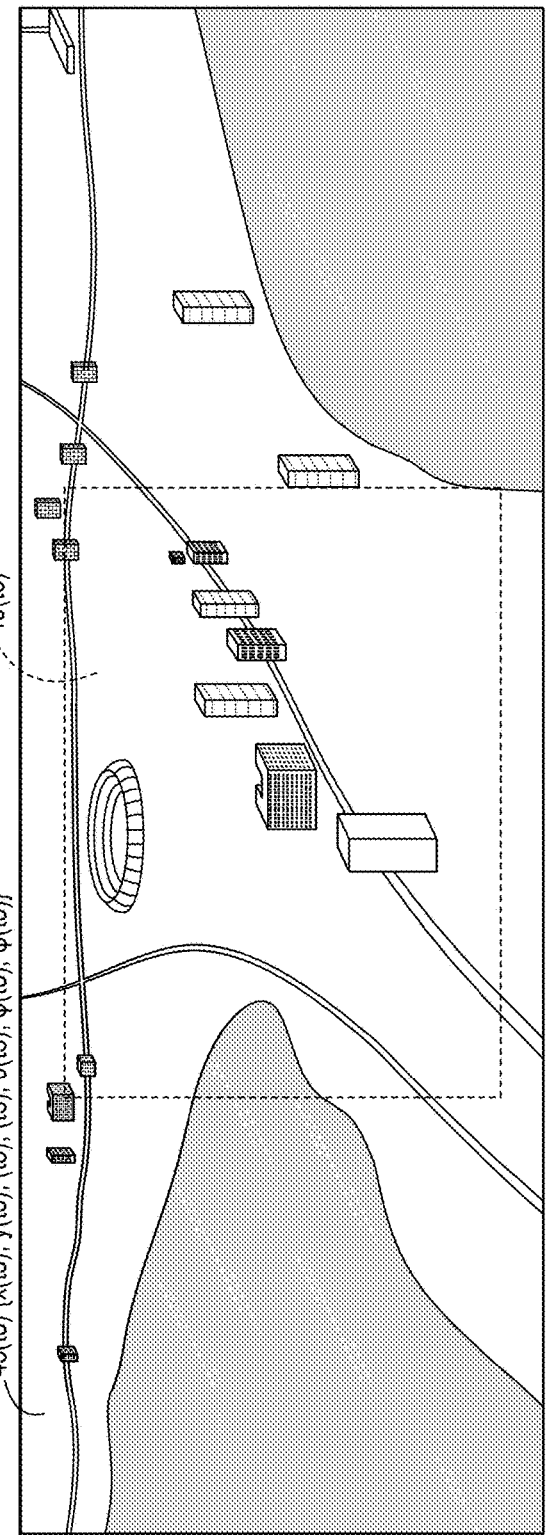
Figure 7C:
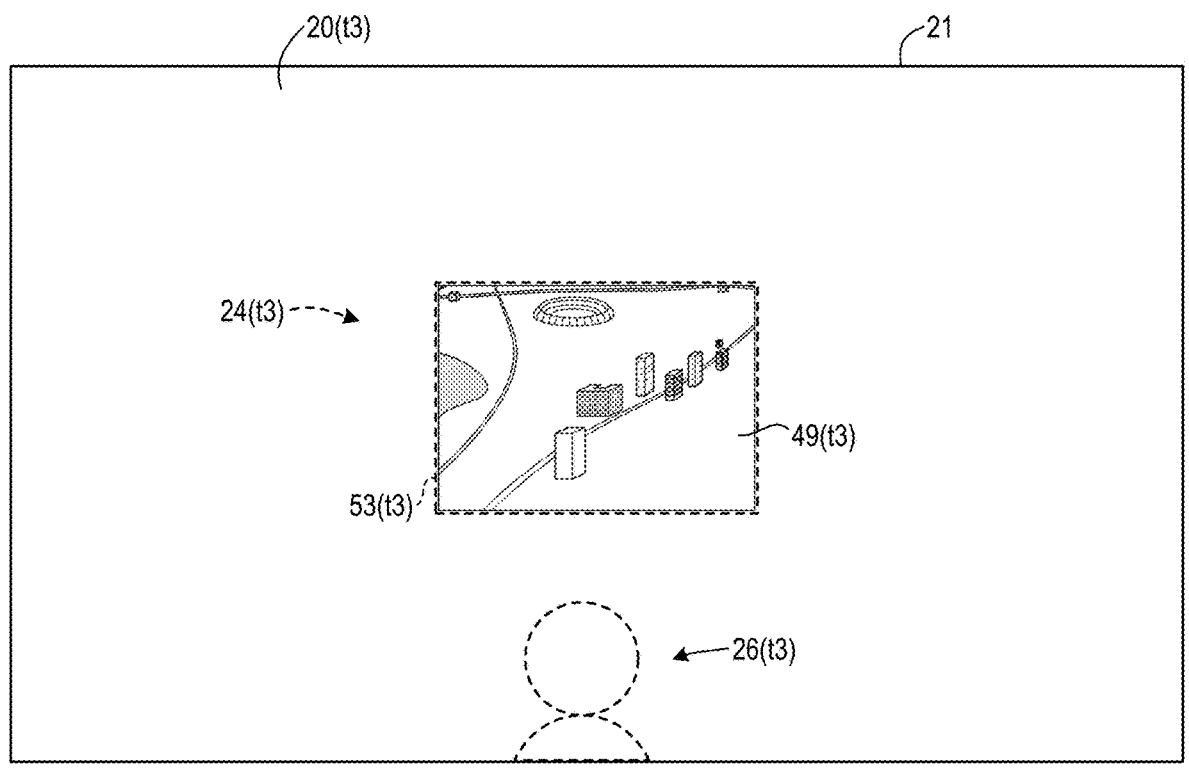

FIG. 7A shows a portion 48(*t*3) of the VR environment 47 corresponding to a position and orientation of the HMD 12 at a time t3. Time t3 may be after time t2. At time t3, the head of the HMD user 11 may not be yawed, pitched, or rolled. FIG. 7B shows a VR content segment 45(*t*3) that may be output via the HMD 12 and that corresponds to the portion 48(*t*3), to the time t3, and to the position and the orientation {x(t3), y(t3), z(t3), θ(t3), φ(t3), ψ(t3)} of the HMD 12 at time t3. Also shown in FIG. 7B is a sub-region 49(*t*3) of the VR content segment 45(*t*3). FIG. 7C shows an observation scene 20(*t*3), corresponding to the VR content segment 45(*t*3) and to the time t3, that may be output via the display 21, and that may be part of the observation video that comprises the observation scenes 20(*t*1) and 20(*t*2). A viewport element 24(*t*3) may comprise a viewport sub-region 53(*t*3) into which the VR content segment sub-region 49(*t*3) has been added. The location and the orientation of the viewport element 24(*t*3) may be based on the position and orientation data, for the HMD 12, corresponding to the VR content segment 45(*t*3). In the example of FIG. 7C, because the head of the HMD user 11 is at time t3 not yawed, pitched, or rolled, the viewport element 24(*t*3) has no rotation and is positioned in the center of the planar view of the three-dimensional space associated with the HMD 12. The element 26(*t*3) may be an image of the HMD user 11, at the time t3, obtained from data received from the camera 16. Although not shown in FIG. 7C, the element 26(*t*3) may show the HMD user 11 looking toward the viewport element 24(*t*3), thereby giving additional clues as to the relationship between the portion of a VR environment that is shown by the viewport element 24(*t*3) and how the HMD user 11 is interacting with (e.g., moving within) that VR environment.

Figure 8A:
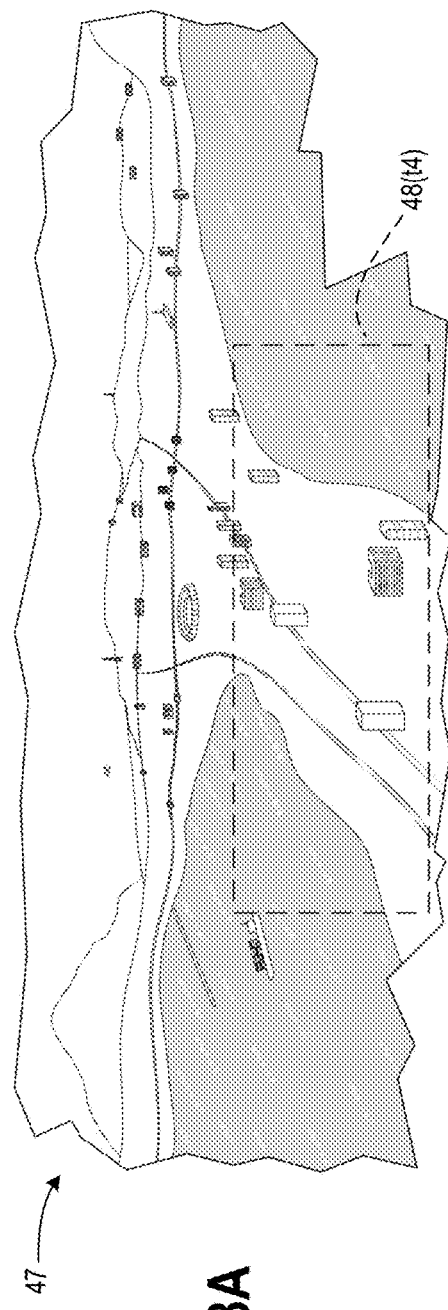
FIGS. 8A, 8B, and 8C are respectively similar to FIGS. 5A, 5B, and 5C, but correspond to a time t4.
Figure 8B:
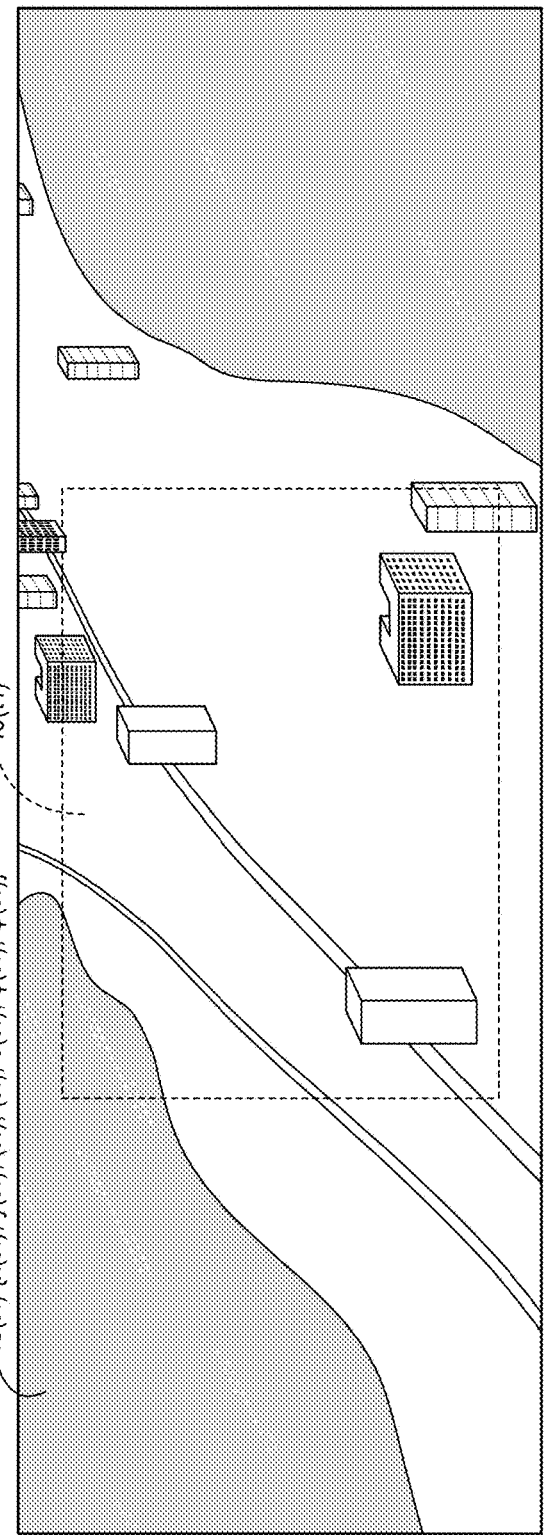
Figure 8C:
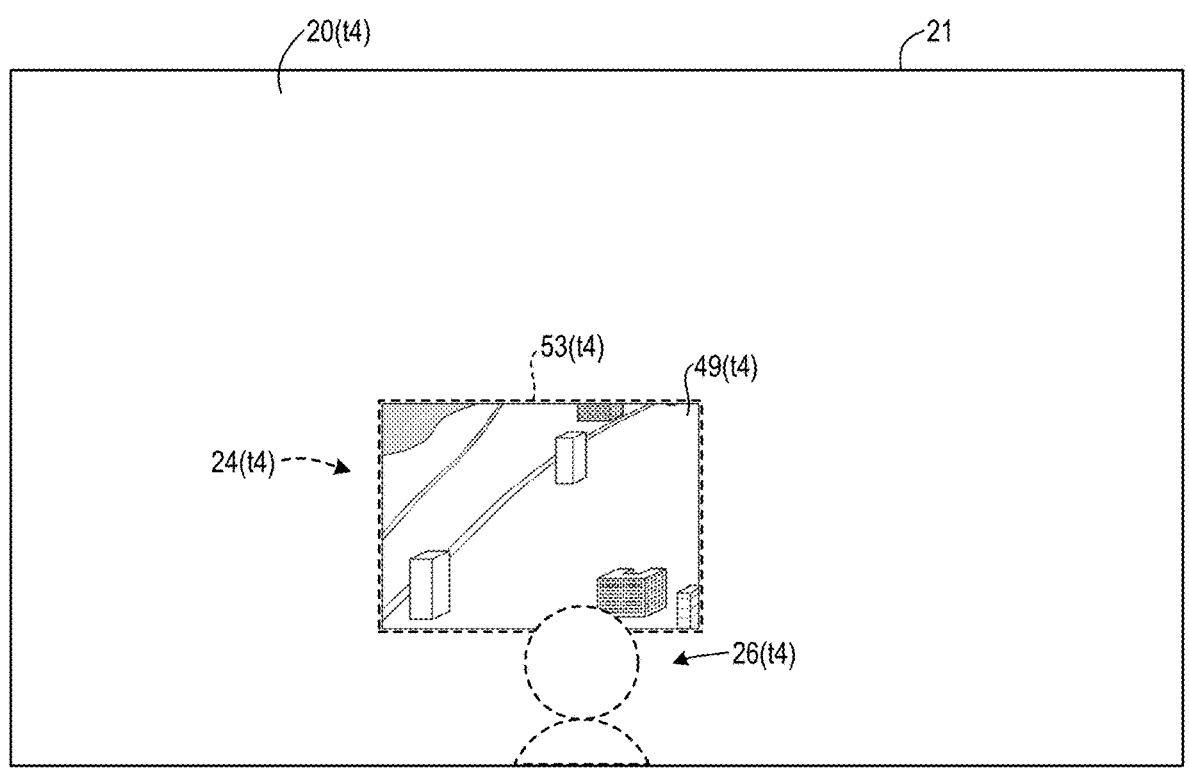

FIG. 8A shows a portion 48(*t*4) of the VR environment 47 corresponding to a position and orientation of the HMD 12 at a time t4. Time t4 may be after time t3. At time t4, the head of the HMD user 11 may be slightly yawed left and pitched down, but may not be rolled. FIG. 8B shows a VR content segment 45(*t*4) that may be output via the HMD 12 and that corresponds to the portion 48(*t*4), to the time t4, and to the position and the orientation {x(t4), y(t4), z(t4), θ(t4), φ(t4), ψ(t4)} of the HMD 12 at time t4. Also shown in FIG. 8B is a sub-region 49(*t*4) of the VR content segment 45(*t*4). FIG. 8C shows an observation scene 20(*t*4), corresponding to the VR content segment 45(*t*4) and to the time t4, that may be output via the display 21, and that may be part of the observation video that comprises the observation scenes 20(*t*1), 20(*t*2), and 20(*t*3). A viewport element 24(*t*4) may comprise a viewport sub-region 53(*t*4) into which the VR content segment sub-region 49(*t*4) has been added. The location and the orientation of the viewport element 24(*t*4) may be based on the position and orientation data, for the HMD 12, corresponding to the VR content segment 45(*t*4). In the example of FIG. 8C, because the head of the HMD user 11 is at time t4 pitched down, yawed left, and not rolled, the viewport element 24(*t*4) has no rotation and is shifted down and to the left in the planar view of the three-dimensional space associated with the HMD 12. The element 26(*t*4) may be an image of the HMD user 11, at the time t4, obtained from data received from the camera 16. Although not shown in FIG. 8C, the element 26(*t*4) may show the HMD user 11 looking toward the viewport element 24(*t*4), thereby giving additional clues as to the relationship between the portion of a VR environment that is shown by the viewport element 24(*t*4) and how the HMD user 11 is interacting with (e.g., moving within) that VR environment.

Figure 9A:
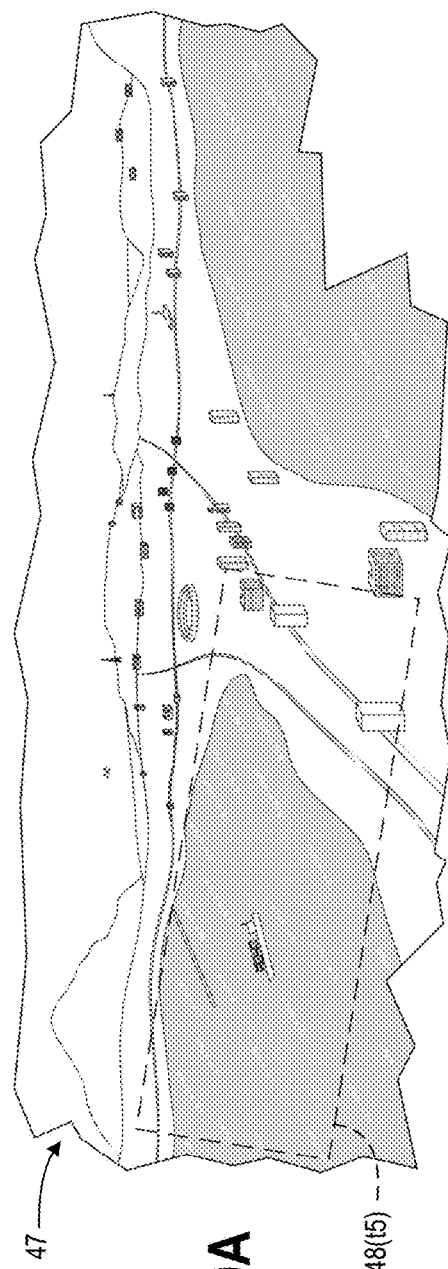
FIGS. 9A, 9B, and 9C are respectively similar to FIGS. 5A, 5B, and 5C, but correspond to a time t5.
Figure 9B:
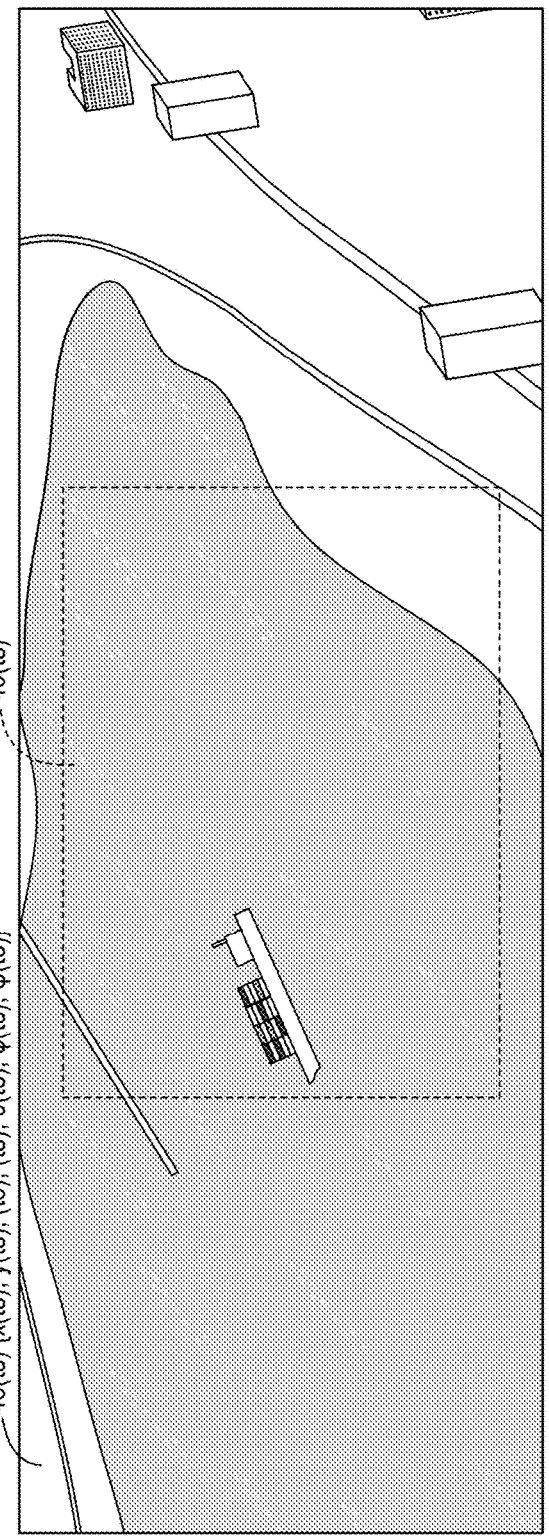
Figure 9C:
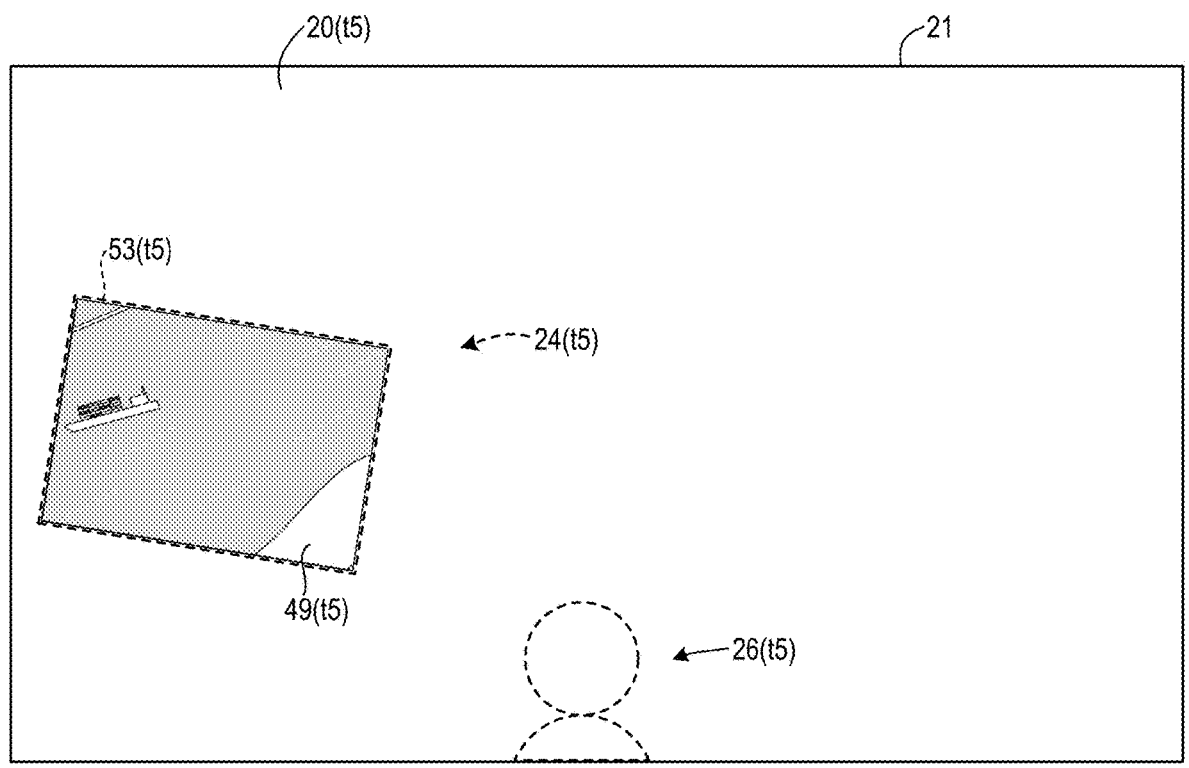

FIG. 9A shows a portion 48(t5) of the VR environment 47 corresponding to a position and orientation of the HMD 12 at a time t5. Time t5 may be after time t4. At time t5, the head of the HMD user 11 may be yawed further left than at time t4, pitched down (but not as far down as at time t4), and rolled clockwise. FIG. 9B shows a VR content segment 45(t5) that may be output via the HMD 12 and that corresponds to the portion 48(t5), to the time t5, and to the position and the orientation {x(t5), y(t5), z(t5), θ(t5), φ(t5), ψ(t5)} of the HMD 12 at time t5. Also shown in FIG. 9B is a sub-region 49(t5) of the VR content segment 45(t5). FIG. 9C shows an observation scene 20(t5), corresponding to the VR content segment 45(t5) and to the time t5, that may be output via the display 21, and that may be part of the observation video that comprises the observation scenes 20(t1), 20(t2), 20(t3), and 20(t4). A viewport element 24(t5) may comprise a viewport sub-region 53(t5) into which the VR content segment sub-region 49(t5) has been added. The location and the orientation of the viewport element 24(t5) may be based on the position and orientation data, for the HMD 12, corresponding to the VR content segment 45(t5). In the example of FIG. 9C, because the head of the HMD user 11 is at time t5 yawed left, pitched down, and rolled clockwise, the viewport element 24(t5) is rotated clockwise and is shifted leftward and slightly downward in the planar view of the three-dimensional space associated with the HMD 12. The element 26(t5) may be an image of the HMD user 11, at the time t5, obtained from data received from the camera 16. Although not shown in FIG. 9C, the element 26(t5) may show the HMD user 11 looking toward the viewport element 24(t5), thereby giving additional clues as to the relationship between the portion of a VR environment that is shown by the viewport element 24(t5) and how the HMD user 11 is interacting with (e.g., moving within) that VR environment.

Figure 10A:
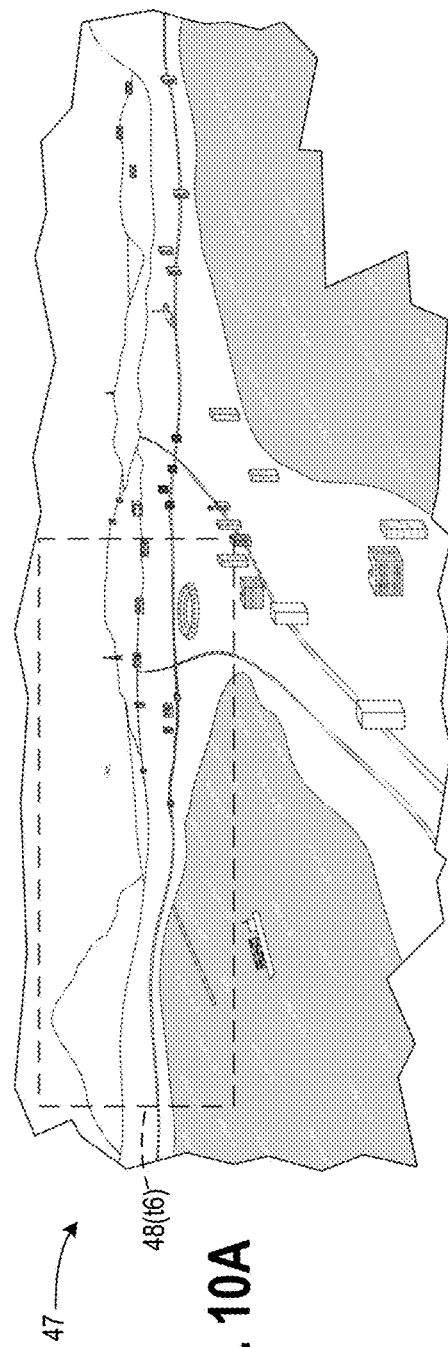
FIGS. 10A, 10B, and 10C are respectively similar to FIGS. 5A, 5B, and 5C, but correspond to a time t6.
Figure 10B:
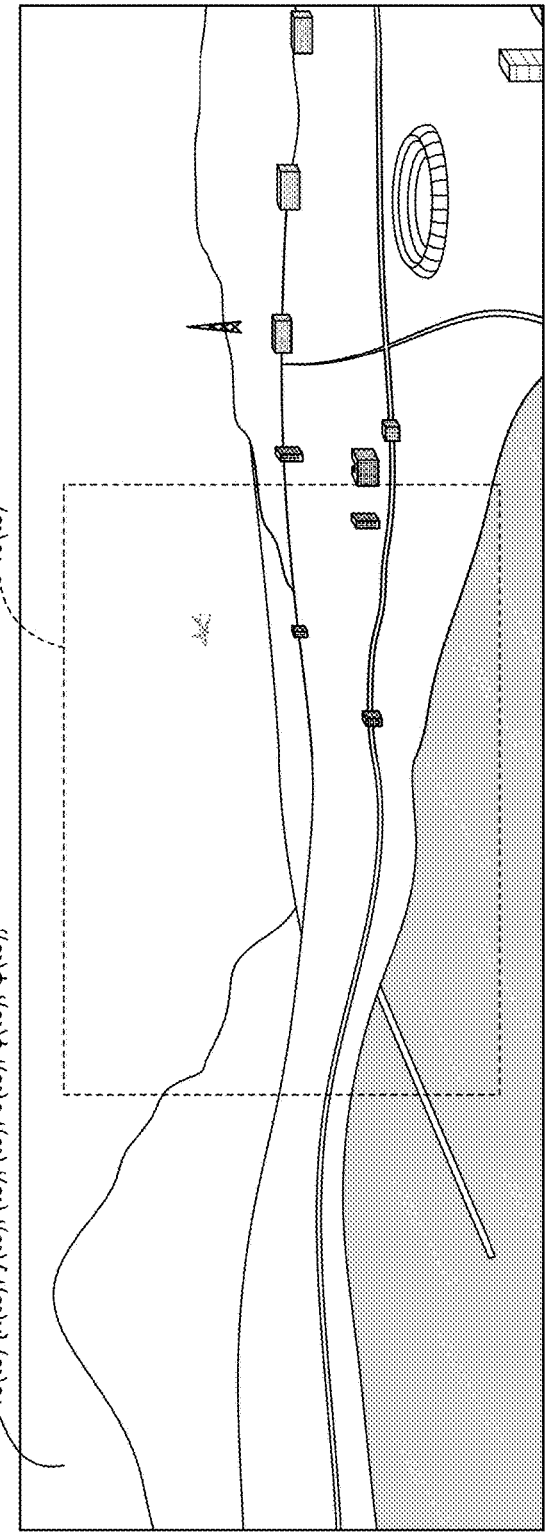
Figure 10C:
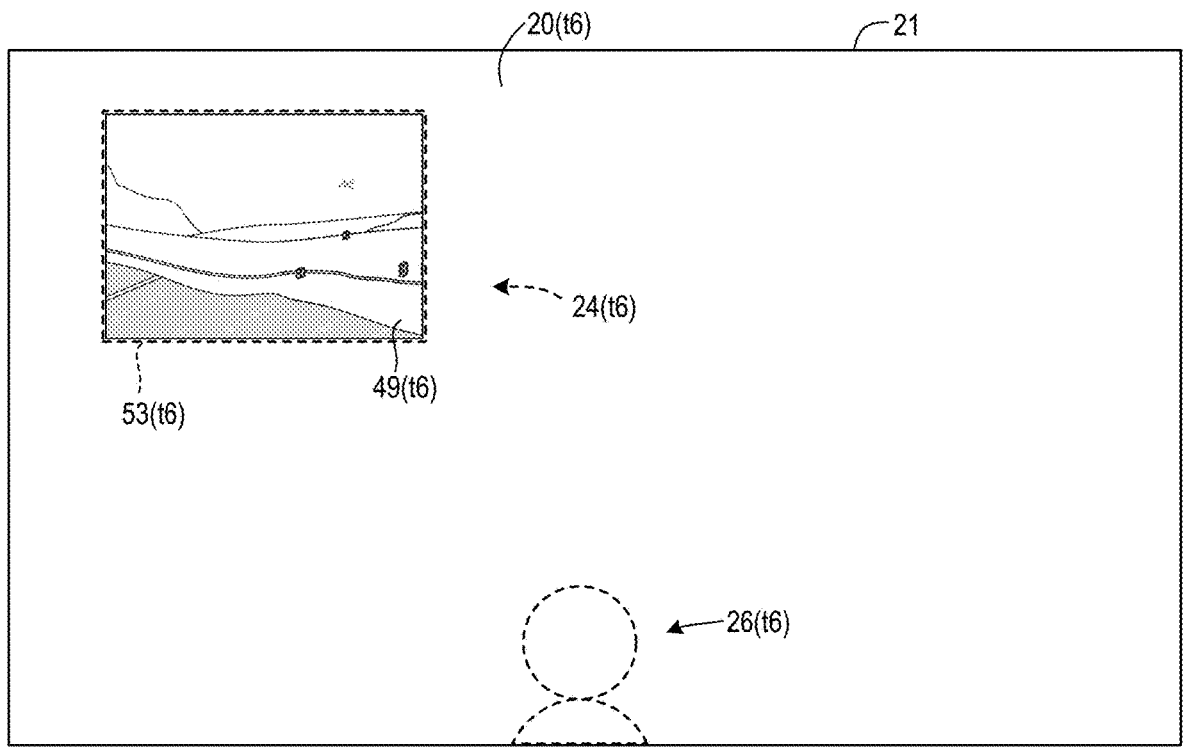

FIG. 10A shows a portion 48(t6) of the VR environment 47 corresponding to a position and orientation of the HMD 12 at a time t6. Time t6 may be after time t5. At time t6, the head of the HMD user 11 may be yawed left, pitched up, and not rolled. FIG. 10B shows a VR content segment 45(t6) that may be output via the HMD 12 and that corresponds to the portion 48(t6), to the time t6, and to the position and the orientation {x(t6), y(t6), z(t6), θ(t6), φ(t6), ψ(t6)} of the HMD 12 at time t6. Also shown in FIG. 10B is a sub-region 49(t6) of the VR content segment 45(t6). FIG. 10C shows an observation scene 20(t6), corresponding to the VR content segment 45(t6) and to the time t6, that may be output via the display 21, and that may be part of the observation video that comprises the observation scenes 20(t1), 20(t2), 20(t3), 20(t4), and 20(t5). A viewport element 24(t6) may comprise a viewport sub-region 53(t6) into which the VR content segment sub-region 49(t6) has been added. The location and the orientation of the viewport element 24(t6) may be based on the position and orientation data, for the HMD 12, corresponding to the VR content segment 45(t6). In the example of FIG. 10C, because the head of the HMD user 11 is at time t6 yawed left, pitched pitch up, and not rolled, the viewport element 24(t6) is not rotated and is shifted leftward and upward in the planar view of the three-dimensional space associated with the HMD 12. The element 26(t6) may be an image of the HMD user 11, at the time t6, obtained from data received from the camera 16. Although not shown in FIG. 10C, the element 26(t6) may show the HMD user 11 looking toward the viewport element 24(t6), thereby giving additional clues as to the relationship between the portion of a VR environment that is shown by the viewport element 24(t6) and how the HMD user 11 is interacting with (e.g., moving within) that VR environment.

Figure 11:
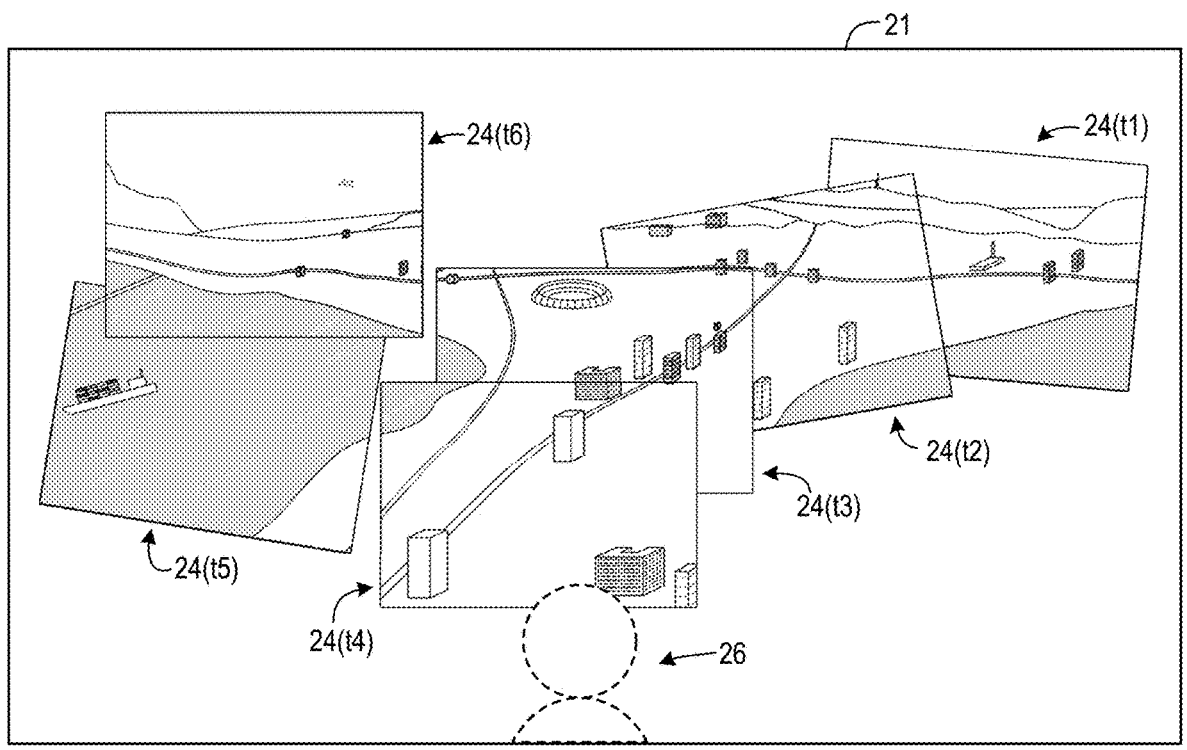
FIG. 11 is a composite of FIGS. 5C, 6C, 7C, 8C, 9C, and 10C further showing movement of a viewport in an observation video.

FIG. 11 is a composite of FIGS. 5C, 6C, 7C, 8C, 9C, and 10C that gives a sense of how the viewport may move in an observation video. In the example of FIGS. 5A-10C, each observation scene may include a single viewport (e.g., only a single viewport may be shown at any time). Because the position of each viewport is based on a corresponding position/orientation of the HMD 12 and a corresponding VR content segment being output via the HMD 12, the observation video comprising those observation scenes may appear to show a viewport that moves on the display in coordination with movement of the HMD 12 (and the head of the HMD user 11).

Figure 12:
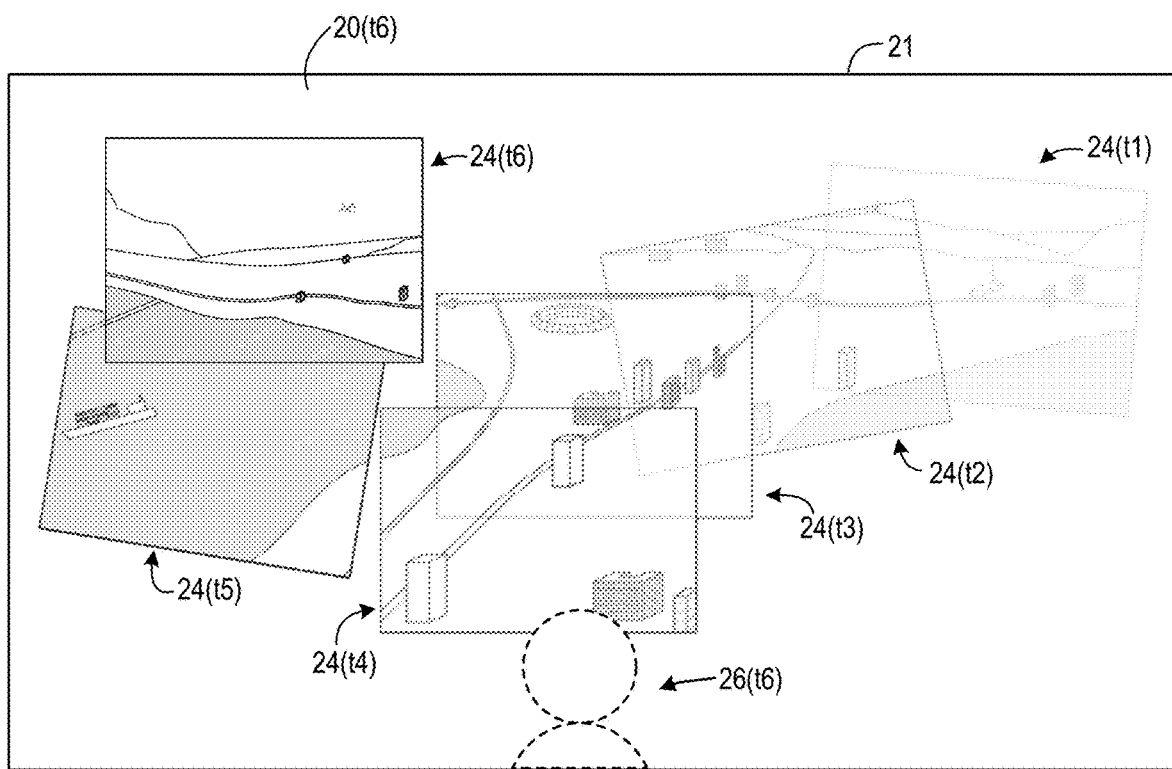
FIG. 12 shows an example of an alternative observation scene.

Alternatively, an observation video may show multiple viewports. For example, a current viewport could be shown with several preceding viewports to create an observation that shows, similar to FIG. 11, a series of viewports. Also or alternatively, and as shown in FIG. 12, viewports could fade over time. In FIG. 12, which may be an alternate version of the observation scene 20(t6), the current viewport 24(t6) is not faded. The viewport 24(t5) preceded the viewport 24(t6) and has faded slightly, the viewport 24(t4) preceded the viewport 24(t5) and has faded more than the viewport 24(t5), the viewport 24(t3) preceded the viewport 24(t4) and has faded more than the viewport 24(t4), etc. An observation video such as the example of FIG. 12 could be created by including, in each observation scene, the current viewport corresponding to the scene and the viewports corresponding to the previous N-1 observation scenes. Each of the N viewports in an observation scene could have a degree of transparency that increases based on the age of the viewport. For example, a current viewport 24(t) for a current time t may have a transparency of zero percent (no transparency), a viewport 24(t-1) for a time t-1 may have a transparency of (N-1)/N percent, a viewport 24(t-2) for a time t-2 may have a transparency of (N-2)/N percent, etc. Other decay algorithms could be used.

In the example of FIGS. 5A-10C, viewport elements 24 have the same shape regardless of the position and orientation of the HMD 12. To provide observers with additional visual cues as to an HMD user's interaction with a VR environment, however, the observation computer 15 may be configured to generate observation scenes in which shapes and/or sizes of viewport elements are based on the HMD spatial data corresponding to the VR content segments corresponding to those viewport elements. For example, a viewport element may be rectangular if the HMD spatial data corresponds to a viewport sub-region that is centered in an observation scene. If the HMD spatial data corresponds to a viewport sub-region that is shifted from the center of an observation scene, the viewport element may be trapezoidal. The shape of the trapezoid may, for example, be determined based on a vertical distance from a center of the observation scene and based on a horizontal distance from the center of the observation scene.

Figure 13:
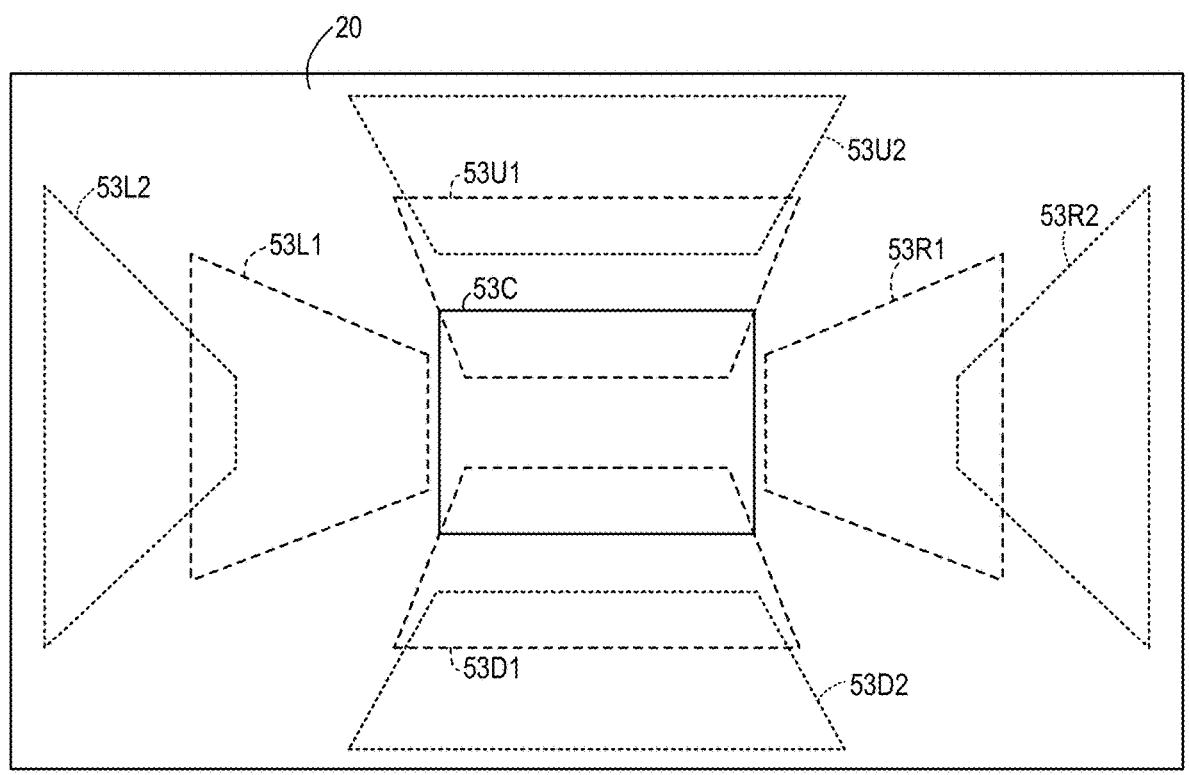
FIG. 13 shows examples of modifications to viewport shape based on HMD motion data.

FIG. 13 shows an example of how the shape of the trapezoid may vary based on HMD motion data. For an orientation of the HMD 12 corresponding to the user 11 looking toward the center of the observation scene 20, a viewport window 53C may be a rectangle centered in the center of the observation scene 20. As the HMD 12 pitches up, and as shown by viewport widows 53U1 and 53U2, the viewport window shape may deform by shortening a base of the trapezoid, lengthening a top side of the trapezoid, and reducing a height of the trapezoid. As the HMD 12 pitches down, and as shown by viewport windows 53D1 and 53D1, the viewport window shape may deform by shortening a top side of the trapezoid, lengthening a base of the trapezoid, and reducing a height of the trapezoid. As HMD 12 yaws right, and as shown by viewport windows 53R1 and 53R2, the viewport window shape may deform by shortening a left side of the trapezoid, lengthening a right side of the trapezoid, and reducing a width of the trapezoid. As the HMD 12 yaws left, and as shown by viewport windows 53L1 and 53L2, the viewport window shape may deform by shortening a right side of the trapezoid, lengthening a left side of the trapezoid, and reducing a width of the trapezoid. For orientations of the HMD that combine pitch and yaw, the shape of the trapezoid may be a combination of the deformations that would result from the pitch and yaw components of that orientation.

Figure 14:
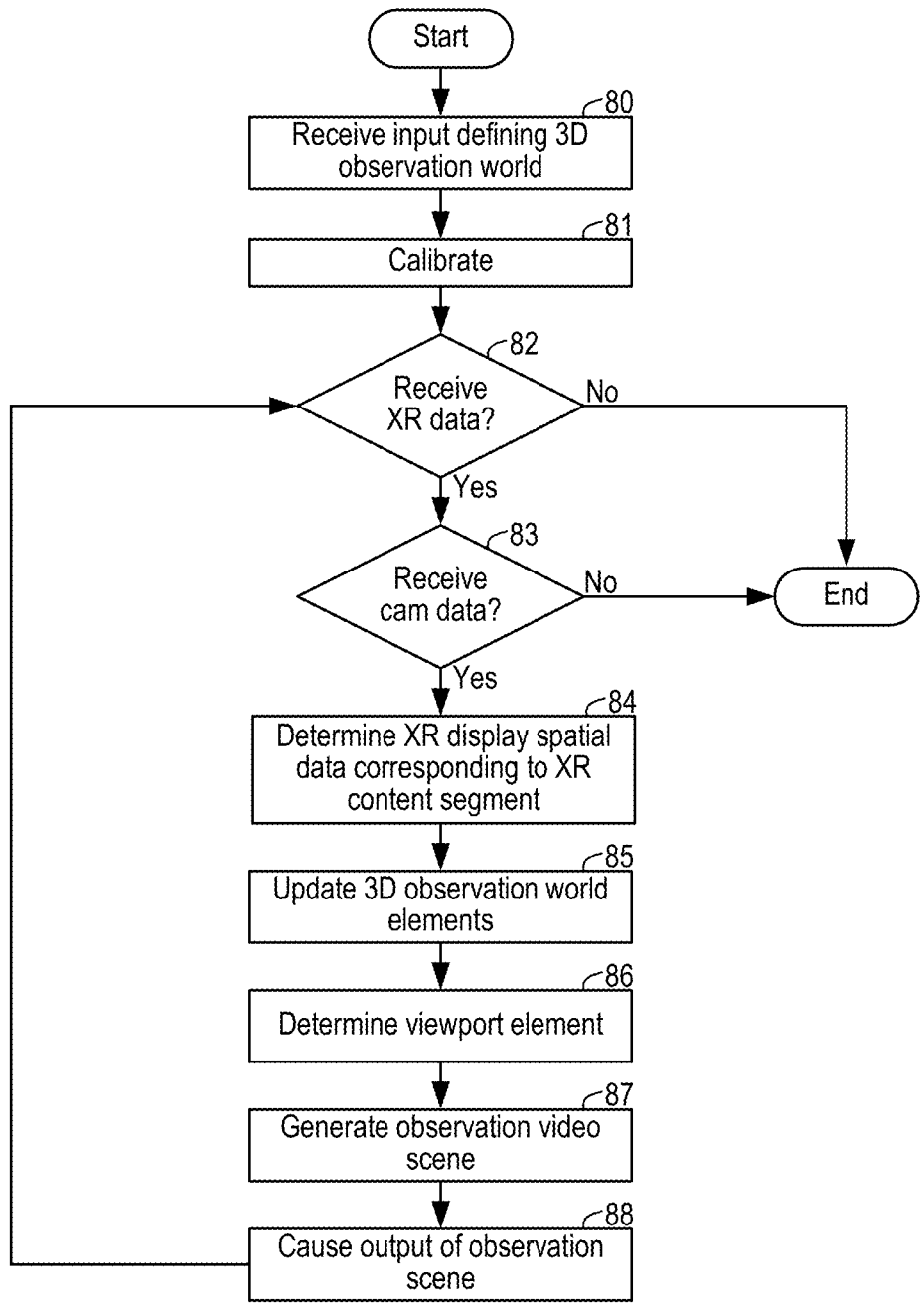
FIG. 14 is a flow chart showing steps of an example method for causing output of an observation video corresponding to XR content (e.g., VR content) output to a user of an XR display (e.g., an HMD).

FIG. 14 is a flow chart showing steps of an example method for causing output of an observation video corresponding to XR content (e.g., VR content) that is being output to an XR user of an XR display (e.g., an HMD). One, some, or all steps of the example method of FIG. 14 may be performed by the observation computer 15. For convenience, FIG. 14 is described below using an example in which the observation computer 15 performs all steps. However, one, some, or all steps of the example method of FIG. 14 may be performed by one or more other computers. One or more steps of the example method of FIG. 14 may be rearranged (e.g., performed in a different order), combined, omitted, and/or otherwise modified, and/or other steps may be added.

In step 80, the observation computer 15 may receive input defining a 3D observation world. The 3D observation world, which may be distinct from an XR environment that the XR user experiences via the XR display, may be what is shown via an observation scene. For example, and as shown in FIG. 1, an observation video may comprise observation scenes 20(t) showing that 3D observation world. The 3D observation world may comprise the XR user (e.g., the HMD user 11), the XR display (e.g., the HMD 12), and a viewport 24(t) that moves about the 3D observation world as the XR display moves. The 3D observation world may be defined in three dimensions and transformed, using conventional transformation methods, for output via two-dimensional displays (e.g., the flat panel display 21). Also or alternatively, the 3D observation world may be output (e.g., using one or scale-rotation-translation matrices) via a three-dimensional display (e.g., an observer HMD separate from the HMD 12).

The 3D observation world may define the viewport as, and/or may render the contents of the viewport within and/or as part of, a curved or flat 2D polygon surface. Also or alternatively, the 3D observation world may define the viewport as, and/or may render the contents of the viewport as, a cloud of particles. Additional elements of the 3D observation world may comprise a polygon surface to display camera view. The XR user and/or the XR display may be defined for representation as images (e.g., captured by the camera 16) and/or as graphical avatars. Additional images and/or graphical avatars may defined (e.g., to represent controllers, hand movements, etc.).

In step 81, the observation computer 15 may perform one or more calibration operations to determine a reference orientation of the XR display (e.g., the HMD 12). For example, instead of (or in addition to) determining HMD spatial data based on video data (e.g., Dat_Cam_vid(t)) received from the camera 16, the observation computer 15 may determine HMD spatial data by using HMD spatial data (e.g., Dat_HMD_sp(t)) received from the VR computer 14. To determine a reference orientation of the HMD 12, the observation computer 15 may be calibrated by having the HMD user 11 assume a predetermined position/orientation relative to the camera 16 (e.g., sitting in a chair having a known location in front of the camera 16 and a known orientation relative to the camera 16, and facing straight ahead with the HMD user 11 head help upright and not yawed, pitched, or rolled). While the HMD user 11 is in the predetermined position/orientation relative to the camera 16, the computer 15 may be configured to associate HMD spatial data, corresponding to the user in the predetermined position/orientation, to a reference position and orientation of the viewport (e.g., centered in an observation scene and not rotated). Step 81 may be omitted if, for example, the computer 15 determines some or all HMD spatial data based on video data from the camera 16 (e.g., by using image recognition to determine a position/orientation of the target 29).

In step 82, the observation computer 15 may determine if XR data (e.g., VR data) has been received for a XR content segment. Such XR data may comprise VR content segment data (e.g., Dat_VR_con(t)). Such data may also comprise XR display spatial data such as HMD spatial data corresponding to the VR content segment (e.g., Dat_HMD_sp(t)). If the XR data is not received, the method may end. If the XR data is received, the observation computer 15 may perform step 83.

In step 83, the observation computer 15 may determine if camera data (e.g., Dat_Cam_vid(t)) has been received from the camera 16. If the camera data is not received, the method may end. If the camera data is received, the observation computer 15 may perform step 84.

In step 84, the observation computer 15 may determine XR display (e.g., HMD) spatial data corresponding to the XR content segment. The determination of step 84 may comprise determining the HMD 12 position and/or orientation by performing image analysis of image data received from the camera 16 (e.g., by determining a position and orientation of the HMD 12 based on a position and orientation determined for the target 29). Also or alternatively, the observation computer 15 may determine XR spatial data corresponding to the XR content segment by using XRD spatial data (e.g., HMD spatial data) received in step 82.

In step 85, the observation computer 15 may update the 3D observation world defined in step 80. As part of step 85, the observation computer may determine data that specifies updated position(s), orientation(s), and or size(s) of various 3D observation world elements (e.g., the XR user, the XR display). The determination of step 85 may be based on calibration data, XR display position data (e.g., Dat_HMD_sp(t)), camera data (e.g., Dat_Cam_vid(t)), and/or other data received in one or more of steps 81 through 84.

In step 86, which may optionally be combined with step 85, the observation computer 15 may determine data that specifies an updated position, orientation, shape, and/or size of the viewport element, as well as a portion of the XR environment to be added to the updated viewport. The determination of step 86 may comprise updating the location of the viewport in the 3D observation world based on XR spatial data (e.g., Dat_HMD_sp(t)), and then applying one or more transforms to obtain direction, distance, size, shape, and content of the viewport.

The observation computer 15 also determine additional transforms that may be combined to create the observation scene. If the viewport is defined as a polygon surface, the observation computer 15 may determine a first translation-scale-rotation matrix (e.g., which may be static) that transforms coordinates from the XR display (e.g., the HMD 12)

coordinate system to a coordinate system of the viewport. The observation computer 15 may determine a second translation-scale-rotation matrix that transforms from the XR display coordinate system to the XR environment. The second translation-scale-rotation matrix may be contained in and/or calculated from XR display spatial data (e.g., Dat_HMD_sp(t)) determined in step 84. The observation computer 15 may determine a third translation-scale-rotation matrix that transforms from the XR environment to the 3D observation world and the coordinate scheme of the 3D observation world. The third translation-scale-rotation matrix may be determined in the calibration step 80, but may be updated in step 86 if, for example, the camera 16 has moved, if the XR software changes the origin of the XR environment, and/or if there are other changes affecting the XR environment or the 3D observation world. The determined translation-scale-rotation matrices may be multiplied to obtain a viewport-to-camera transformation that transforms from a pixel space of the XR environment to a pixel space of the 3D observation environment. If the viewport surface shows depth information, a polygon mesh of that surface may also be updated using depth information from the XR content data (e.g., Dat_VR_con(t)).

If the viewport is rendered as a cloud of particles, for each pixel of an XR content segment, a particle may be added to the 3D observation world at a location indicated by the x,y location and depth information for the XR content pixel. Depth information for each pixel of the XR content segment may be obtained from the XR display spatial data (e.g., Dat_HMD_sp(t)). Also or alternatively, depth information may be estimated using simultaneous localization and mapping (SLAM) and/or a combination of left/right stereo video images and motion-parallax from previous frames. Depth and x,y pixel location in an XR content segment may be converted to a vector emanating from the XR display to a 3D location corresponding to a virtual object represented by the pixel. To determine the location of each added particle in the 3D observation word, the observation computer 15 may determine XR-environment-to-3D-observation-world pixel transformations, similar to those described above, for each pixel of the XR content segment. Those transformations may be multiplied on a per pixel basis.

Also or alternatively, if the viewport is defined as a cloud of particles, step 86 may comprise applying a fade operation to particles already present (e.g., from previous frames and/or iterations of steps 82 through 88). A cull operation may be applied to delete any particles that have faded more than a threshold value.

In step 87, the observation computer 15 may generate an observation scene. Step 87 may comprise updating geometry of a virtual camera for the observation scene (e.g., a virtual camera having the position/perspective from which the observation scene appears to be generated; the virtual camera position/perspective may or may not be the same as that of the camera 16). If the observation scene is output via a 2D display, this updating may comprise applying zoom and/or pan to increase a percentage of the observation scene showing the viewport. If the observation scene is output via an observation HMD (e.g., a second HMD separate from the HMD 12), this updating may be based on spatial and/or content data from that observation HMD.

The observation scene may be generated using known 3D graphics rendering methods. An image of the XR user from the camera 16 may be rendered, to a user polygon surface defined for the 3D observation world and updated in step 85, by using camera pixels as a texture. A portion of the XR content segment may be rendered, to the viewport defined for the 3D observation world and updated in step 85, by using a portion of the XR content segment pixels as a texture. The portion of the content segment that is added to the viewport is determined by the portion of the XR content segment, as transformed to the 3D observation world, that coincides with the viewport. Other 3D observation world elements (e.g., controllers, user arms, etc.) may also be rendered as textures (e.g., from an image from camera 16) to corresponding polygon surfaces. Lighting effects (e.g., based on ray-tracing from the XR content segment as a light source on the user avatar or other elements) may be applied.

The generating of step 87 may comprise generating a blank image the size of an image from the camera 16. The blank image may contain whatever background is desired. If the observation scene being generated is to include a previous viewport from a previous observation scene, that fading viewport may be updated to fade that previous viewport. For each pixel in the XR content segment for the current observation scene, the viewport-to-camera transformation may be applied and the pixel updated. For each pixel in the camera 16, the observation computer 15 may determine (e.g., using green screening, rotoscoping, or other method) whether the pixel will show the XR user (or other element to be shown from a camera 16 image) or the background, and may update the pixel.

In step 88, the observation computer 15 may cause output of the observation scene. Step 88 may comprise sending video data for the generated observation scene (e.g., Dat_Obs_vid(t)) to a display device (e.g., the display device 21), and/or otherwise causing the display device to output the observation scene. Step 88 may also or alternatively comprise sending video data for the generated observation scene to a memory for storage, and/or otherwise causing the video data to be stored. After step 88, the observation computer 15 may repeat step 82.

An observation scene may be generated and output using operations in addition to, and/or instead of, one or more of the operations described above in connection with steps 85 through 87. For example, the observation computer 15 may determine, based on the XR display spatial data determined in step 84, a nominal center for a viewport sub-region of an observation scene. A nominal center of a viewport sub-region may, for example, comprise a location in the observation scene that is determined based on the XR display spatial data and where a centroid of the viewport window will be located. Any of various methods may be used to determine a nominal center based on the XR display spatial data. As but one example, the XR display spatial data may be used to determine a vector that has its origin in the plane of the observation scene at a position corresponding to the XR display (e.g., the HMD 12), and that extends forward into the display. The vector may be determined based on a vector corresponding to an assumed gaze direction that is centered in the XR display horizontal FOV and the XR display vertical FOV, which direction may be determined by XR display orientation data (e.g., values of $\theta(t)$, $\varphi(t)$, and $\psi(t)$ from the HMD spatial data). An intersection of that vector with a hypothetical concave hemispherical surface inside the 3D observation world (e.g., the inside of a hemisphere that would be formed if the plane of the display 21 bisected a sphere) may be used as the nominal center.

The observation computer 15 may determine a shape for the viewport sub-region. In the example of FIGS. 5A-10C, viewport elements 24 have the same shape regardless of the position and orientation of the HMD 12. To provide observers with additional visual cues as to an HMD user's interaction with a VR environment, however, the observation computer 15 may be configured to generate observation video scenes in which shapes of viewport elements are based on the HMD spatial data corresponding to the VR video scenes corresponding to those viewport elements. For example, and as shown in FIG. 13, a viewport element may be rectangular if the HMD spatial data corresponds to a viewport sub-region that is centered in an observation scene. If the HMD spatial data corresponds to a viewport sub-region that is shifted from the center of an observation scene, the viewport element may be trapezoidal. The shape of the trapezoid may be determined based on a vertical distance of a nominal center of the viewport window from a center of the observation scene and based on a horizontal distance of the nominal center of the viewport window from the center of the observation scene.

The observation computer 15 may determine rotation for the viewport sub-region. The rotation may, as shown in the examples of FIGS. 5A-10C, correspond to the head roll of the HMD user 11. The amount of that head roll may, for example, be determined using the $\varphi(t)$ of the HMD spatial data. The observation computer 5 may determine of sub-region of the VR content segment for placement into the determined viewport sub-region. If the shape of the viewport sub-region is not dependent on the position of the viewport sub-region, and if size of the viewport sub-region is constant, this may comprise determining (e.g., selecting) a predetermined region of the VR content segment, which predetermined region may be the same for multiple VR content segments (e.g., a region in the center of the HMD view and having a fixed width and height that are less than the width and height of the VR content segment). Examples of this type of selection are provided above in connection with FIGS. 5B, 5C, 6B, 6C, 7B, 7C, 8B, 8C, 9B, 9C, 10B, and 10C. Also or alternatively, the VR content segment sub-region may be determined in a different way. For example, some HMDs may be configured to track gaze direction of the HMD wearer's eyes. For such an HMD, a sub-region may be determined by selecting a sub-region that is centered on a portion of the VR content segment that corresponds to the wearer's gaze direction. If the shape of the viewport sub-region is dependent on the position of the viewport sub-region in the observation scene, the shape determined in step 86 may be used to determine the sub-region of the VR content segment. For example, the observation computer 15 may select a sub-region of the VR content segment that has the shape determined in step 86, with a centroid of that shape positioned on an assumed gaze direction (e.g., centered in the HMD horizontal FOV and the HMD vertical FOV) or on an actual gaze direction (e.g., provided by the HMD using eye tracking).

The observation computer 15 may generate the observation scene based on the viewport sub-region and based on the determined VR content segment sub-region. To do so, the observation computer 15 may generate a background and may overlay the VR content segment sub-region on the viewport sub-region. If the viewport sub-region is rotated, the VR content segment sub-region may be similarly rotated before adding to the viewport sub-region. If the observation scene is to include an HMD user element 26, the observation computer 15 may generate that element 26 (e.g., using green screening or other methods for isolating elements of video frames) from the video data received from the camera 16 and may add that element 26 to the observation scene.

As described above, an observation video may be generated based on HMD spatial data that comprises HMD position and orientation data that correspond to a VR content segment. Also or alternatively, an observation video may be generated using only HMD orientation data (e.g., $\theta(t)$, $\varphi(t)$, $\psi(t)$). For example, if an HMD user's head remains relatively still during interaction with a VR environment, and/or if the VR video largely comprises objects at large virtual distances from the HMD user's eyes, ignoring positional data (e.g., x(t), y(t), z(t)) in HMD spatial data may not significantly affect determination of viewport sub-regions or VR content segment sub-regions.

In examples described above, an observation scene may include HMD user elements 26 (e.g., images) that are generated based on data from a camera capturing video of the HMD user 12. An HMD user element 26 may be omitted. Moreover, an HMD user element, if included, need not be based on an image from video of a user captured by a camera. For example, an HMD user element 26 may comprise an animated avatar.

In examples described above, an observation scene may provide a perspective in which observers are behind the HMD wearer and viewing viewports that appear to be in front of the HMD wearer. Observation scenes may have other perspectives. For example, observation scenes may provide a perspective in which observers are in front of the HMD wearer and looking towards that HMD wearer. Viewports may appear in the observation scenes as images located between the HMD wearer and observers, and/or as a simulated reflection on the front portion of the HMD. In such observation scenes, the VR content segments sub-regions may be reversed so as to convey the impression that the observers are viewing those VR content sub-regions from the rear.

Figure 15:
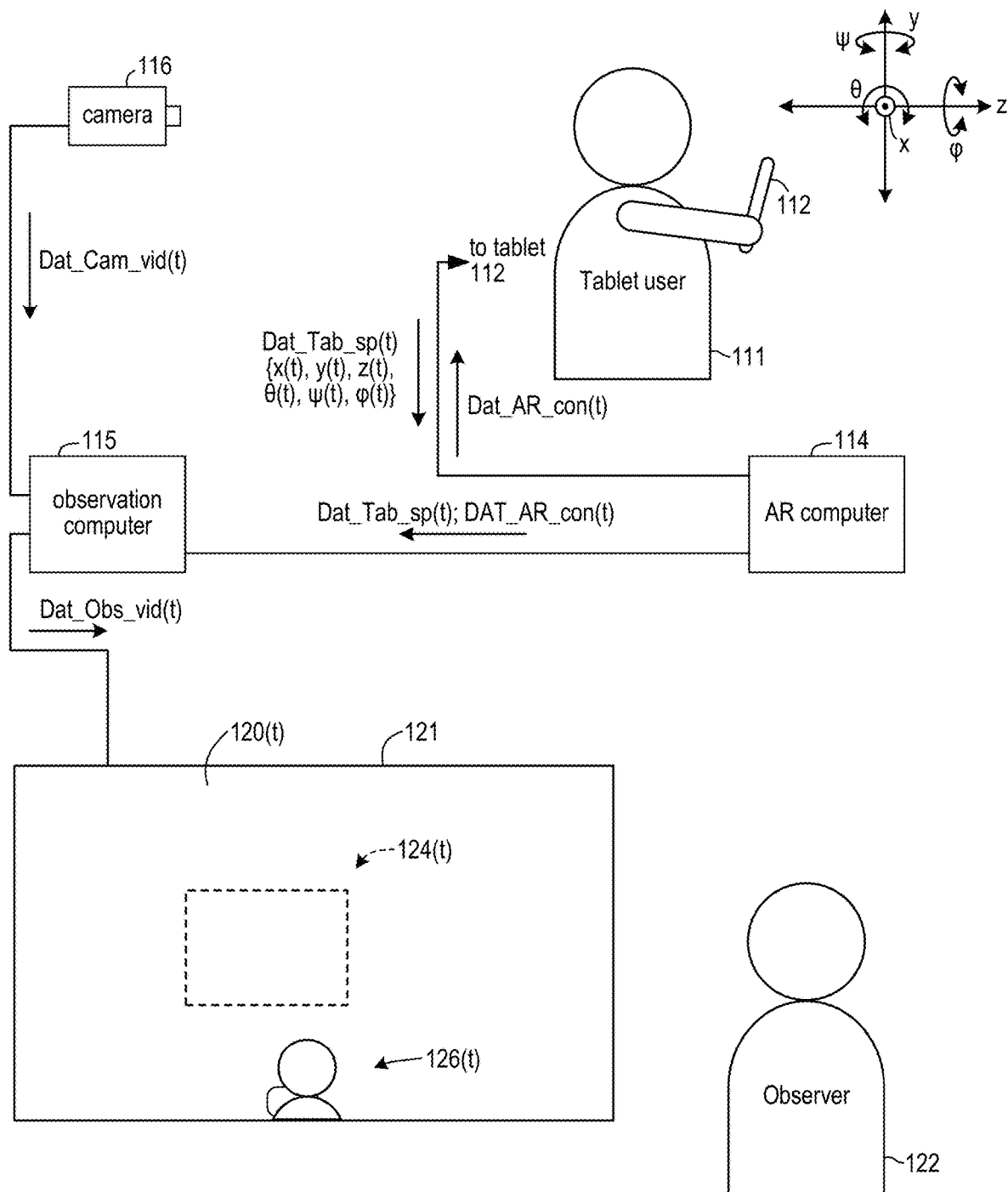
FIG. 15 is a partially schematic block diagram showing elements of another example system for providing one or more observers with an observation video associated with extended reality (XR) content being output via an XR display.

FIG. 15 is a partially schematic block diagram showing elements of another example system for providing one or more observers with a viewport video associated with XR content being output to an XR user via an XR display. The example of FIG. 15 is similar to that of FIG. 1. In the example of FIG. 15, however, the XR display is a tablet computer 112 and the XR content is AR content being output to a user 111 via the tablet 112. An observation scene 120(t) viewed by one or more observers 122 is similar to the observation scene 20(t), except that the viewport 24(t) shows a portion of the AR content being output to the user 111 via the tablet 112. An AR computer 114 receives XR display spatial data Dat_Tab_sp(t) from the tablet 112. Based on the XR display spatial data, the AR computer 11 generates XR content data (Dat_AR_con(t)) that is renderable by the tablet 112 and sends that data to the tablet 112. The AR computer 114 may output that XR content data and the XR display spatial data to an observation computer 115, which may be similar to (and operate similar to) the observation computer 15. A camera 116 may be similar to, and may operate similar to, the camera 16. A display 21 may be similar to the display 121. The example system of FIG. 15 may operate similar to that example system of FIG. 1. In the system of FIG. 15, however, the observation scene may comprise an element 126(t) representing a current orientation and/or position of the user 111 and the tablet 112, and the position, orientation, size, shape, and/or content of the viewport 124(t) may be based on the position and orientation of the tablet 112 and on the AR content being output to the user 111 via the tablet 12.

In the examples described above, observation scenes may be generated by adding XR content segments sub-regions from a single feed. Observation videos may be generated based on multiple feeds (e.g., from multiple HMD users who are simultaneously experiencing the same VR environment). For example, an observation scene may comprise a first viewport, for a VR content segment sub-region from a first feed, that is positioned/oriented/shaped based on HMD spatial data for a first HMD associated with the first feed, a second viewport, for a VR content segment sub-region from a second feed, that is positioned/oriented/shaped based on HMD spatial data for a second HMD associated with the second feed, etc.

An observation video need not be output via a flat panel display. For example, an observation video may be output via a separate HMD. Outputting an observation video via a separate HMD may allow, for example, preservation of stereoscopic data in VR content segment sub-regions added to viewports, thereby providing an observer with a moving three-dimensional window into the VR environment being experienced by a wearer of an HMD being used to control the VR environment.

Methods and system similar to those described above may also be used to provide observation video based on video feeds from other types of HMDs. For example, certain types of head-worn devices may generate video of an actual environment in a FOV of a wearer of the device. Examples of such devices may, for example, comprise night vision systems. Such devices may comprise one or more forward-facing cameras that capture video and that replay that video to the wearer via an eyepiece. Although video output from these and other types of HMDs may be output to a separate display for one or more observers, simply showing the raw video output on a separate display may have many of the same problems (e.g., inducing nausea and/or headaches) associated with showing raw VR video via a separate display. The above-described methods and systems may be modified to accept a feed from a forward-looking camera of an HMD, and to further receive HMD spatial data from that HMD (e.g., from a 6 degrees-of-freedom motion sensor that may be mounted to the HMD). Also or alternatively, HMD motion data may be determined by motion estimation from comparing successive images from the HMD camera.

XR content may comprise audio content. For example, a VR environment may comprise sound that appears to come from a different direction, relative to an HMD, as an HMD is moved. Sound from XR content could be output as part of an observation video comprising observation scenes. That sound may be output without additional processing, or may first be processed so the apparent source of the sound remains fixed relative to an observer and/or in a 3D observation world.

An observation video may be streamed to multiple displays. Observation scenes may be output in forms other than, or in addition to, output via a flat panel display. For examples, as mentioned above, observation video and/or other content comprising observation scenes may be output via additional HMDs. Also or alternatively, observation video and/or scenes may be output as AR and/or MR content via a tablet or other display held controlled an observer. Observation video and/or scenes may be output holographically.

Observation video and/or other content comprising observation scenes may be rendered using 3D rendering, 2D rendering, and/or apparent 2D rendering. Any of various rendering techniques may be used (e.g., polygon/raster rendering, conversion of 2D+stereo or 2D+depth map video to a field of particles, secondary ray tracing (e.g., to put XR environment light onto a webcam feed), etc.). Methods described herein may also be used to create observation video (and/or other content comprising observation scenes) based on content that a user (e.g., a player of a first person shooter video game) is viewing (and/or with which that user is interacting) via a conventional flat panel display. In such a case, orientation information (e.g., the orientation of the user within a game environment) may be recoverable from the content (e.g., the game), and/or may be derived from the content (e.g., in post-processing of a video feed from a game).

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, sub-combinations, and permutations of structure, operations, and/or other features described herein and in the accompanying drawing figures.

The invention claimed is:

1. A method comprising:
   outputting, to a display device separate from an extended reality (XR) display used by an XR user, an observation video comprising a plurality of viewport regions that move on a display of the display device in coordination with movements of the XR display, wherein the outputting comprises, for each of the viewport regions:
   receiving XR content data comprising a portion of an XR environment viewable via the XR display in an orientation of the XR display that corresponds to the viewport region, wherein the portion is a subset of content rendered by the XR display;
   receiving XR display spatial data that indicates the orientation of the XR display that corresponds to the viewport region;
   determining, based on the orientation of the XR display that corresponds to the viewport region:
   a size, relative to the display of the display device, of the viewport region corresponding to a subportion of the portion of the XR environment;
   an orientation, relative to the display of the display device, of the viewport region; and
   a position, within the display of the display device, of the viewport region; and
   generating, as a portion of the observation video and based on the subportion, the viewport region having the determined size, the determined orientation, and the determined position.

2. The method of claim 1, wherein each of the viewport regions occupies less than all of the display of the display device.

3. The method of claim 1, wherein the XR environment comprises a virtual reality (VR) environment and the XR display comprises a head-mounted display (HMD) worn by the XR user.

4. The method of claim 1, wherein the XR environment comprises an augmented reality (AR) environment and the XR display comprises a tablet computer held by the XR user.

5. The method of claim 1, wherein the XR display spatial data further indicates a position of the XR display.

6. The method of claim 1, wherein the generating the portion of the observation video comprises adding one of:
   an avatar, representing the XR user, separate from the viewport regions, or
   an image, from video of the XR user, of the XR user.

7. The method of claim 1, wherein, for each of the viewport regions:
   a horizontal field of view (FOV) of the viewport region is narrower than a horizontal FOV of the portion of the XR environment viewable via the XR display in the orientation of the XR display that corresponds to the viewport region, a vertical FOV of the viewport region is narrower than a vertical FOV of the portion of the XR environment viewable via the XR display in the orientation of the XR display that corresponds to the viewport region, and the subportion comprises a center of the portion of the XR environment viewable via the XR display in the orientation of the XR display that corresponds to the viewport region.

8. A computer comprising:

one or more processors; and memory storing instructions that, when executed by the one or more processors, cause the computer to:

output, to a display device separate from an extended reality (XR) display used by an XR user, an observation video comprising a plurality of viewport regions that move on a display of the display device in coordination with movements of the XR display, wherein the outputting comprises, for each of the viewport regions:

receiving XR content data comprising a portion of an XR environment viewable via the XR display in an orientation of the XR display that corresponds to the viewport region, wherein the portion is a subset of content rendered by the XR display;

receiving XR display spatial data that indicates the orientation of the XR display that corresponds to the viewport region;

determining, based on the orientation of the XR display that corresponds to the viewport region:

a size, relative to the display of the display device, of the viewport region corresponding to a subportion of the portion of the XR environment;

an orientation, relative to the display of the display device, of the viewport region; and a position, within the display of the display device, of the viewport region; and generating, as a portion of the observation video and based on the subportion, the viewport region having the determined size, the determined orientation, and the determined position.

9. The computer of claim 8, wherein each of the viewport regions occupies less than all of the display of the display device.

10. The computer of claim 8, wherein the XR environment comprises a virtual reality (VR) environment and the XR display comprises a head-mounted display (HMD) worn by the XR user.

11. The computer of claim 8, wherein the XR environment comprises an augmented reality (AR) environment and the XR display comprises a tablet computer held by the XR user.

12. The computer of claim 8, wherein the XR display spatial data further indicates a position of the XR display.

13. The computer of claim 8, wherein the generating the portion of the observation video comprises adding one of:

an avatar, representing the XR user, separate from the viewport regions, or an image, from video of the XR user, of the XR user.

14. The computer of claim 8, wherein, for each of the viewport regions:

a horizontal field of view (FOV) of the viewport region is narrower than a horizontal FOV of the portion of the XR environment viewable via the XR display in the orientation of the XR display that corresponds to the viewport region, a vertical FOV of the viewport region is narrower than a vertical FOV of the portion of the XR environment viewable via the XR display in the orientation of the XR display that corresponds to the viewport region, and the subportion comprises a center of the portion of the XR environment viewable via the XR display in the orientation of the XR display that corresponds to the viewport region.

15. A non-transitory computer-readable medium comprising instructions that, when executed, cause a computer to:

output, to a display device separate from an extended reality (XR) display used by an XR user, an observation video comprising a plurality of viewport regions that move on a display of the display device in coordination with movements of the XR display, wherein the outputting comprises, for each of the viewport regions:

receiving XR content data comprising a portion of an XR environment viewable via the XR display in an orientation of the XR display that corresponds to the viewport region, wherein the portion is a subset of content rendered by the XR display;

receiving XR display spatial data that indicates the orientation of the XR display that corresponds to the viewport region;

determining, based on the orientation of the XR display that corresponds to the viewport region:

a size, relative to the display of the display device, of the viewport region corresponding to a subportion of the portion of the XR environment;

an orientation, relative to the display of the display device, of the viewport region; and a position, within the display of the display device, of the viewport region; and generating, as a portion of the observation video and based on the subportion, the viewport region having the determined size, the determined orientation, and the determined position.

16. The non-transitory computer-readable medium of claim 15, wherein each of the viewport regions occupies less than all of the display of the display device.

17. The non-transitory computer-readable medium of claim 15, wherein the XR environment comprises a virtual reality (VR) environment and the XR display comprises a head-mounted display (HMD) worn by the XR user.

18. The non-transitory computer-readable medium of claim 15, wherein the XR environment comprises an augmented reality (AR) environment and the XR display comprises a tablet computer held by the XR user.

19. The non-transitory computer-readable medium of claim 15, wherein the XR display spatial data further indicates a position of the XR display.

20. The non-transitory computer-readable medium of claim 15, wherein the generating the portion of the observation video comprises adding one of:

an avatar, representing the XR user, separate from the viewport regions, or an image, from video of the XR user, of the XR user.

21. The non-transitory computer-readable medium of claim 15, wherein, for each of the viewport regions:

a horizontal field of view (FOV) of the viewport region is narrower than a horizontal FOV of the portion of the XR environment viewable via the XR display in the orientation of the XR display that corresponds to the viewport region, a vertical FOV of the viewport region is narrower than a vertical FOV of the portion of the XR environment viewable via the XR display in the orientation of the XR display that corresponds to the viewport region, and the subportion comprises a center of the portion of the XR environment viewable via the XR display in the orientation of the XR display that corresponds to the viewport region.

\* \* \* \* \*